United States Patent
Pratt

(10) Patent No.: US 9,667,291 B2
(45) Date of Patent: May 30, 2017

(54) UNWANTED COMPONENT REDUCTION SYSTEM

(71) Applicant: ANALOG DEVICES GLOBAL, Hamilton (BM)

(72) Inventor: Patrick Joseph Pratt, Mallow (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 14/527,608

(22) Filed: Oct. 29, 2014

(65) Prior Publication Data

US 2015/0288399 A1    Oct. 8, 2015

(30) Foreign Application Priority Data

Apr. 8, 2014  (GB) .................................. 1406346.5

(51) Int. Cl.
*H04B 1/12* (2006.01)

(52) U.S. Cl.
CPC .................................. *H04B 1/123* (2013.01)

(58) Field of Classification Search
CPC . H04B 1/10; H04B 1/12; H04B 1/109; H04B 1/123; H04B 1/525; H03D 1/04; H03D 7/18; H04L 25/03178; H04L 25/03267; H03J 7/04; H07M 1/06
See application file for complete search history.

(56) References Cited

U.S. PATENT DOCUMENTS

| | | | |
|---|---|---|---|
| 4,635,278 A | 1/1987 | Maloon et al. | |
| 5,271,038 A | 12/1993 | Cai | |
| 5,812,611 A * | 9/1998 | Sogabe | H03J 7/04 327/47 |
| 6,038,433 A | 3/2000 | Vegt | |
| 6,792,047 B1 | 9/2004 | Bixby et al. | |
| 7,346,134 B2 * | 3/2008 | Smith | H04B 1/123 375/346 |
| 7,680,476 B2 | 3/2010 | Tränkle | |
| 7,840,384 B2 | 11/2010 | Feldhaus et al. | |
| 8,358,993 B2 * | 1/2013 | Quinlan | H03D 7/18 455/237.1 |
| 2008/0039045 A1 | 2/2008 | Filipovic et al. | |
| 2008/0171527 A1 | 7/2008 | Masoian | |
| 2009/0086864 A1 | 4/2009 | Komninakis et al. | |
| 2009/0096514 A1 | 4/2009 | Xu et al. | |

(Continued)

FOREIGN PATENT DOCUMENTS

| | | |
|---|---|---|
| CN | 101502007 | 8/2009 |
| CN | 101971506 | 2/2011 |

(Continued)

OTHER PUBLICATIONS

European Search Report of Jul. 13, 2015 for European Application No. 15161411.2. 8 pages.

(Continued)

*Primary Examiner* — Thanh Le

(74) *Attorney, Agent, or Firm* — Knobbe, Martens, Olson & Bear, LLP

(57) ABSTRACT

A system is described for forming an estimate of an unwanted signal component that may be formed as a result of non-linearities in a system. The estimate is used to form a cancellation signal which is added to an input signal to reduce the influence of the unwanted component.

23 Claims, 18 Drawing Sheets

(56) References Cited

U.S. PATENT DOCUMENTS

| | | |
|---|---|---|
| 2011/0286618 A1 | 11/2011 | Vandali et al. |
| 2013/0208838 A1 | 8/2013 | Wu et al. |
| 2013/0249720 A1* | 9/2013 | Matsuura ............... H03M 1/06 341/118 |
| 2015/0289154 A1 | 10/2015 | Pratt |

FOREIGN PATENT DOCUMENTS

| | | |
|---|---|---|
| DE | 10 2005 008734 | 8/2006 |
| EP | 1 267 496 | 12/2002 |
| JP | 2001-111457 | 4/2001 |
| JP | 2001-159603 | 6/2001 |
| JP | 2007-013984 | 1/2007 |
| JP | 2007-240170 | 9/2007 |
| JP | 2008-145374 | 6/2008 |
| JP | 2010-093711 | 4/2010 |
| JP | 2011-509046 | 3/2011 |
| JP | 2012-177581 | 9/2012 |
| KR | 10-2004-0004572 | 1/2004 |
| KR | 10-2009-0039834 | 4/2009 |
| KR | 10-2010-0096273 | 9/2010 |
| WO | WO 02/093807 | 11/2002 |
| WO | WO 2011-004578 | 1/2011 |

OTHER PUBLICATIONS

Japanese Office Action of Mar. 30, 2016 for Japanese Patent Application No. 215-078422, filed Apr. 7, 2015, 4 pages and 7 pages translation.

Korean Office Action and translation of Feb. 1, 2016 for Korean Patent Application No. 10-2015-0048208, filed Apr. 6, 2015. 9 pages, 7 page translation.

Liu, Bede & Mintzer, Fred, "Calculation of Narrow-Band Spectra by Direct Decimation," IEEE Transactions on Acoustics, Speech, and Signal Processing, vol. ASSP-26, No. 6, Dec. 1978, pp. 529-534.

Prabhu, A.V., et al., "Frequency Zooming Techniques for High Resolution Spectrum Analysis", Def Sci. J., vol. 35, No. 3, Jul. 1985, pp. 281-285.

Nawrocki, C.W. & Ferrie, James F., "Zoom FFT—An Approximate Vernier Frequency Algorithm," dated Nov. 22, 1972 and filmed in Oct. 1977. Available at: http://www.dtic.mil/cgi-bin/GetTRDoc?Location=U2&doc=GetTRDoc.pdf&AD=ADA044461 (accessed: Aug. 12, 2016).

Chinese Office Action of Mar. 2, 2017 for Chinese Patent Application No. 201510162134.8, 8 pages.

* cited by examiner $\theta_{LS} = \theta_{old} + \mu\{R_o + \lambda I\}^{-1} c_o$

UNWANTED COMPONENT REDUCTION SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, this application claims the benefit of G.B. Patent Application No. 1406346.5, filed on Apr. 8, 2014, the entire disclosure of which is hereby incorporated by reference herein.

TECHNICAL FIELD

This disclosure relates to an apparatus for and method of estimating a unwanted, often non-linear, component in a signal, and using the estimate to reduce the impact of the non-linear component.

BACKGROUND

In radio receivers, a received radio frequency (RF) signal is amplified and demodulated. This process often includes a frequency translation operation where the incoming signal is mixed with a locally generated signal. This enables subsequent amplification stages to be performed over a narrower pass band. This makes it easier to build amplifiers and other components with acceptable levels of distortion, noise and power consumption characteristics. Despite these operations, non-linearity may still exist within the RF signal processing path and/or the baseband signal processing path. The non-linearity may result from the performance of real world transistors as opposed to ideal ones, or charging and discharging of explicit or parasitic capacitors in signal processing elements, such as analog to digital converters, giving rise to non-linearity.

SUMMARY OF CERTAIN INVENTIVE ASPECTS

In some applications, such as radio telephony base stations, low power consumption, selectivity, linearity and small size are desirable.

It is desirable to provide increasing amounts of RF receiver architecture within a single integrated circuit package, and preferably on a single semiconductor die.

It is also desirable to provide a receiver that is operable to cover a plurality of modes and/or frequency bands.

It is also desirable to provide solutions where the customer can operate a device without detailed knowledge of how to operate the device.

The present disclosure relates to a RF receiver system in which certain embodiments address some, and preferably all, of the above objectives.

According to a first aspect of this disclosure, there is provided an apparatus for reducing the impact of an unwanted signal component on a wanted signal component. The apparatus comprises means for processing an input signal containing both the wanted signal component and potentially the unwanted signal component to create an estimated unwanted signal. The apparatus then compares the estimated unwanted signal with the input signal and/or an output signal to enable it to create a cancellation signal. The cancellation signal is combined with the input signal to partially or substantially cancel the unwanted signal component.

The unwanted signal component may be a narrow band signal or a broadband signal. When the unwanted signal is a narrowband signal, the apparatus may identify the narrowband unwanted signal and seek to minimize its influence on the output signal. By creating a correction signal that is primarily intended to cancel only the selected narrowband unwanted signal, it becomes computationally easier to create a correction signal that is effective at reducing the impact of the unwanted signal component.

The unwanted signal component may be generated as the result of non-linearity in a signal processing circuit giving rise to the generation of harmonic terms. The apparatus may deliberately apply equivalent non-linear processing to the input signal. Such non-linear processing may include forming the square of the input signal, the third power of the input signal and so on.

The non-linearity may be estimated at a narrow or nominally a single frequency. If, for example, the pass band of a signal processing circuit, such as a radio receiver, coupled to the input of the signal processing apparatus included a wanted signal centered around frequency $F_w$ and an unwanted signal, often referred to as a "blocker" centered around FB, then the signal processing circuit may be arranged to estimate a correction signal for the second harmonic $2F_B$ of the blocker signal. This may improve recovery of the wanted signal at $F_w$ when $F_w$ is substantially the same as $2F_B$.

The signal processing circuit may estimate coefficients to be applied to the estimate of the unwanted signal to generate a correction signal. The correction signal may be generated by passing the estimated error signal through a filter. The filter may be finite impulse response (FIR) filter.

Frequency translation of the unwanted frequency component may be performed in order to allow the filter to operate at a nominally constant frequency. Therefore, the filter taps and coefficients may remain the same when the apparatus is in use. Given that all of this signal processing may be done in the digital domain, i.e., frequency translation by multiplying with a repetitive waveform and filtering, the designer might choose to omit the frequency translation and instead retune the digital filter.

The pressures to provide multi-mode and multi-frequency receivers are found in a number of operating environments. An example of such an environment is the mobile telephony space where devices may receive signals operating at one of a plurality of standards, such as 2G, 3G, 4G, LTE and so on.

Each of these standards (or other standards in other communications systems) tends to be highly regulated, for example, in terms of required acceptance bandwidth, sensitivity, immunity to interfering signals and so on.

According to a further aspect of this disclosure, there is provided a receiver including a circuit constituting an embodiment of the first aspect of this disclosure.

According to a further aspect of this disclosure, there is provided a method of reducing an unwanted signal component within an output signal, the method comprising receiving an input signal containing a wanted signal component and potentially an unwanted signal component; operating on the input signal to form an estimate of the unwanted signal component; generating a correction signal; combining the correction signal with the input signal; and monitoring the output signal to refine the correction signal so as to reduce the influence of the unwanted signal.

BRIEF DESCRIPTION OF THE DRAWINGS

Embodiments of a signal processing system for reducing the impact of an unwanted component in accordance with this disclosure will now be described, by way of non-limiting example, with reference to the accompanying drawings in which.

DETAILED DESCRIPTION OF CERTAIN EMBODIMENTS

There is generally an advantage in moving away from traditional high intermediate frequency heterodyne receiver architectures, such as in mobile telephony systems, as with an increasingly crowded frequency spectrum it can be increasingly difficult to find a suitable place to locate the intermediate frequency signal where the spectrum is 'quiet'.

Many radio receiver systems are moving towards low intermediate frequency or zero intermediate frequency architectures.

Such approaches enable integrated circuit providers to provide or propose integrated circuits where quadrature mixers, variable gain amplifiers, filters and analog to digital converters are provided on a single integrated circuit. Furthermore, digital domain signal processing can also be provided on the chip/integrated circuit to process the output of an analog to digital converter. The local oscillator for such a system may be provided 'on chip' as well, i.e., within the same circuit package.

Such an integrated circuit can offer reduced cost through integration; greater ease of use for a customer as it moves closer to a system-on-chip style solution; and/or relaxation of RF signals processing and routing specifications and simplification of frequency planning. This is particularly relevant where several receivers are provided in close proximity.

Figure 1:
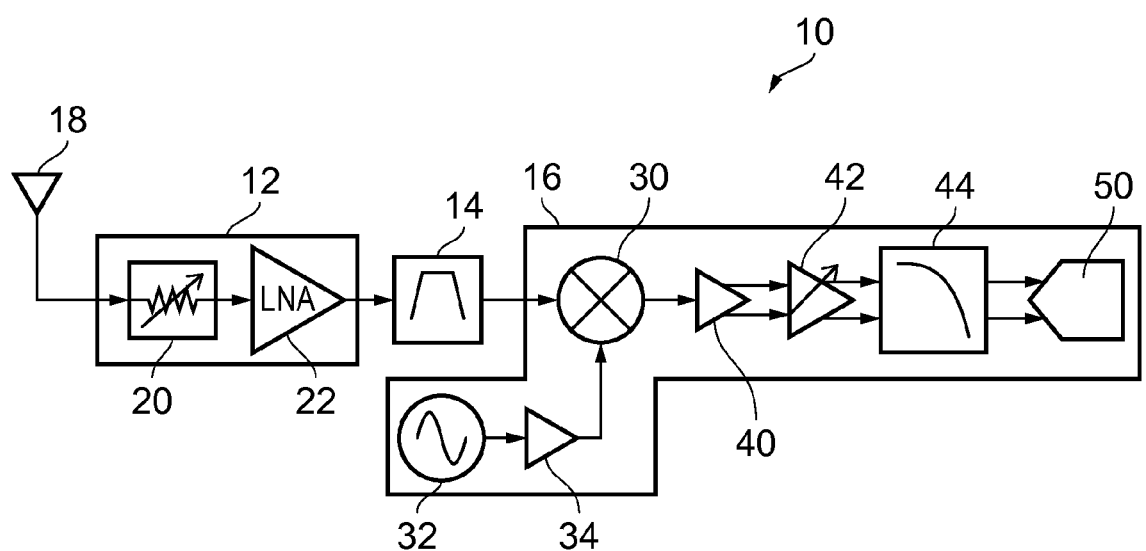
FIG. 1 is a block diagram of a receiver operating at zero intermediate frequency.
Figure 2:
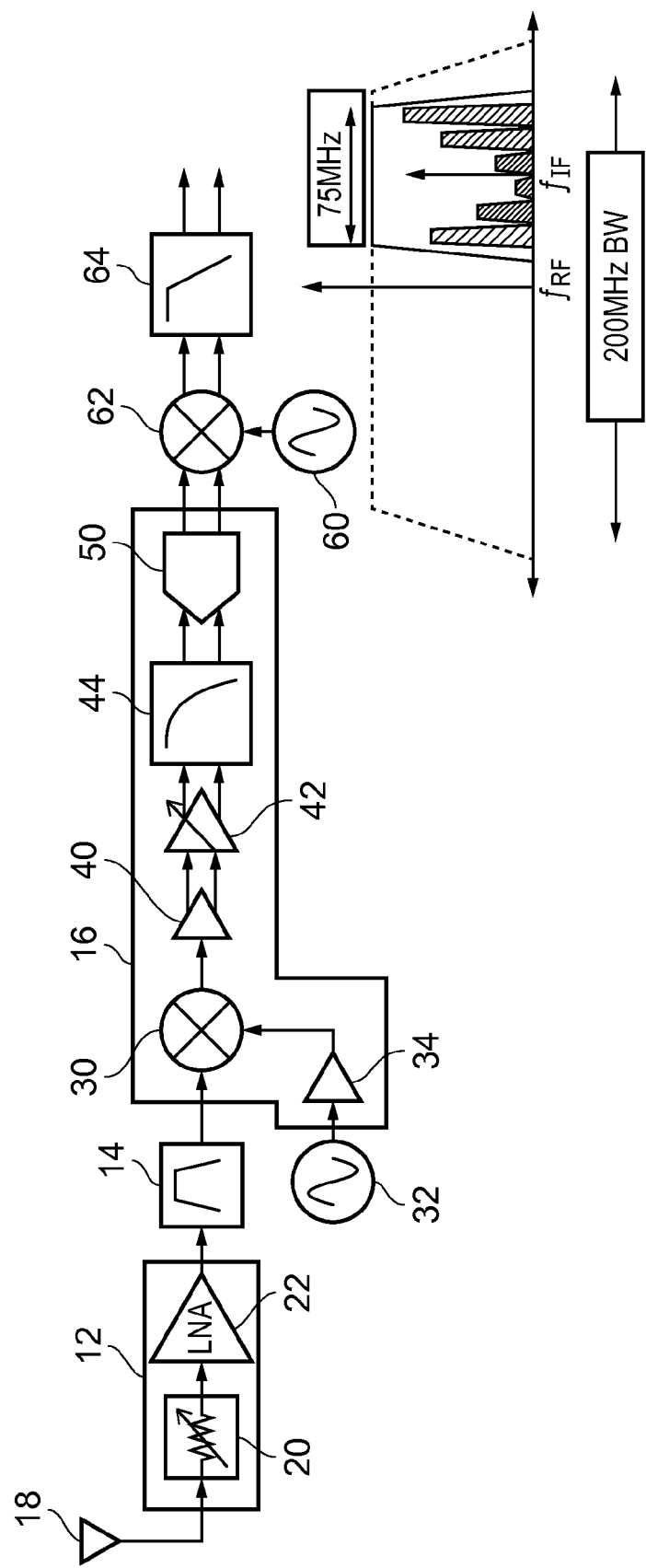
FIG. 2 is a block diagram of a receiver that is configured to operate at a low intermediate frequency.

The architectures of direct conversion receivers and low IF (intermediate frequency) receivers are similar. FIG. 1 is a schematic block diagram of a direct conversion receiver, and FIG. 2 is a schematic block diagram of a low IF receiver.

The direct conversion receiver, generally designated 10 in FIG. 1, broadly comprises three functional blocks. As illustrated, the direct conversion receiver 10 of FIG. 1 comprises an RF amplification stage 12, a filter 14 and a down-converter 16. The RF amplification stage 12 receives a signal from an antenna 18 and provides a controllable gain, represented in FIG. 1 by a variable attenuator 20 and a low noise amplifier 22. The output from the RF amplification stage 12 is band pass filtered, for example, by a surface acoustic wave (SAW) filter 14. Other filter technologies may alternatively or additionally be used. An output of the filter 14 is provided to a RF input of the down-converter 16.

The down-converter 16 comprises a quadrature mixer 30 which receives the amplified RF input signal at a mixer signal input, and mixes this with local oscillator (LO) signals supplied to local oscillator inputs of the mixer 30. The local oscillator signal(s) are provided by a local oscillator 32. The local oscillator 32 may be provided as an integrated component (in the same integrated circuit package as the mixer 30) or as a separate component. The output of the local oscillator 32 may be buffered by a buffer or amplifier 34 prior to being supplied to the mixer 30. As is known to the person skilled in the art, a quadrature mixer 30 typically comprises two mixers, one to work on an in-phase signal (or I channel) and one to work on signals whose phase is shifted by $\pi/2$ radians (90 degrees) relative to the in-phase signal, the quadrature channel (or Q channel). To achieve this, the LO signal from the local oscillator 32 can be generated as two LO signals of the same frequency but offset by 90 degrees, or the local oscillator signal can subsequently be processed to generate the two phase shifted local oscillator signals desired by a quadrature mixer 30. In real world systems, the I and Q channels are typically approximately 90 degrees out of phase without each other and may not be exactly 90 degrees out of phase.

If the incoming signal has a carrier frequency of $W_C$ (whether the carrier actually exists or has been wholly or partially suppressed), then the local oscillator signal can also be set to $W_C$ so that direct down conversion to DC/baseband is performed.

Local oscillator signals of the desired frequency can be derived using phase locked loops and the like as known to the person skilled in the art.

The I and Q channels from the mixer 30 may then be subjected to further gain, for example by a fixed gain amplifier 40 and a variable gain amplifier 42, before being low pass filtered by a filter 44 to remove out of band interference, and then sent to an analog to digital converter 50 to digitize the I and Q channels.

The low IF receiver of FIG. 2 has similarities with the direct conversion receiver of FIG. 1, and like parts have been shown using like reference numbers. Conceptually, the low IF receiver has two local oscillators. A first local oscillator 32 can be set to a frequency $W_L$ such that mod $(W_C-W_L)=IF$, where IF is a desired intermediate frequency. A second local oscillator can be provided to generate a second local oscillator frequency to enable a second mixer 62 to downconvert the signals to baseband prior to being passed through a low pass filter 64.

However, since the I and Q signals have been digitized by the ADC 50, the operations of second local oscillator frequency generation and mixing end filtering can all be performed digitally.

Thus, both functions can be performed by combined digital circuits.

FIG. 2 includes a graph showing the frequency spectrum available at the output of the ADC 50. In a direct conversion receiver as disclosed here, the "baseband" may have a bandwidth of around 200 MHz. For multichannel GSM, a bandwidth of about 75 MHz is desired. Thus, the first local oscillator 32 can be set to give a nominal first intermediate frequency inside the pass band, for example at about 150 MHz, and the second local oscillator 60 can act to down convert that to baseband.

A desirable feature of a receiver is its ability to deal with the presence of a relatively strong interfering signal. An example of such a specification is the 3GPP TS 51.021 blocker test. In this test, a local blocking signal is introduced into the receiver with a strength of −1 dBFS (one dB less than full scale signal strength). Any harmonics from mixing the blocker signal with the local oscillator signal should be at least 90 dB down on the blocker power, as part of the test specification. Non-linearities resulting in mixing or amplification stages can be regarded as RF non-linearities. Any non-linearity as a result of baseband components, such as the ADC 50, can be regarded as a baseband non-linearity. RF non-linearities and/or baseband non-linearities can be reduced and/or eliminated using embodiments of the apparatus disclosed here.

In the following description, the focus will be on reducing $2^{nd}$ order baseband non-linearity for illustrative purposes. Such a baseband non-linearity may be modelled as $I^2(n-m)+jQ^2(n-m)$, where n is a sample index and m is a positive integer delay (e.g., m=0, 1, 2, etc.). It will be understood that the principles and advantages discussed herein can be applied to reduce or eliminate other non-linearities.

If the apparatus was targeting a RF non-linearity of order, say k, then a suitable non-linearity model may include terms of the form $|I(n-m1)+jQ(n-m1)|^{\wedge}(2k-1)*(I(n-m2)+jQ(n-m2))$.

A feature of using CMOS is that digital gates are relatively inexpensive and can be fabricated to perform additional processing of the signal from the ADC 50. This can be exploited to correct impairments of the RF or analog components, and/or to remove interference received at the antenna 18.

Figure 3:
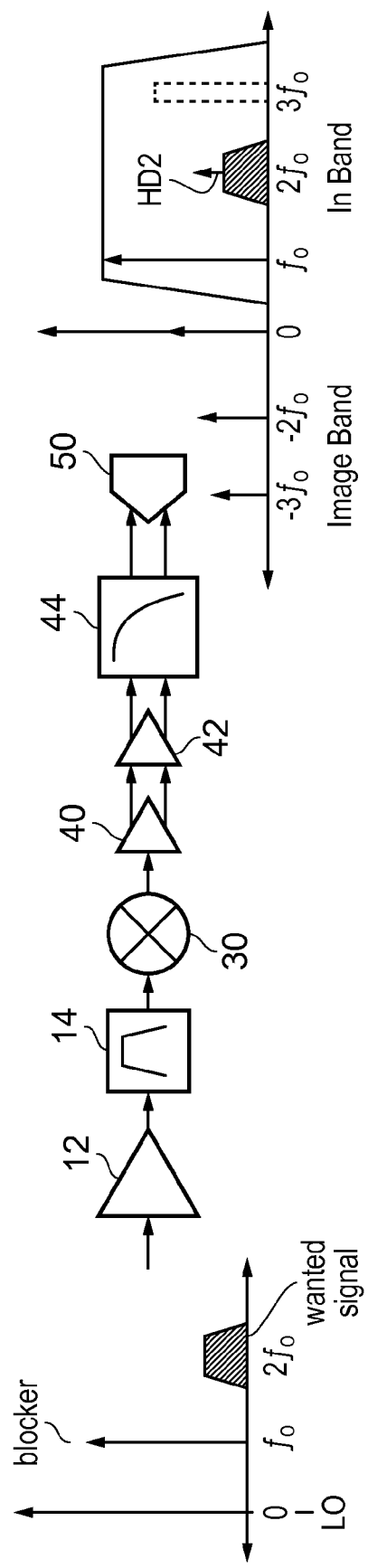
FIG. 3 schematically illustrates the transformation of a spectrum at the input of a receiver, in which the frequencies are referenced to a local oscillator, with the spectrum at to output of the receiver as a result of non-linearity within the receiver.

For example, a significant blocking signal can be observed in a mobile telephony system. Such an arrangement is schematically illustrated in FIG. 3, where all frequencies are shown referenced to the local oscillator frequency. The signal of interest, e.g., a signal associated with a telephone call, may occupy a frequency band centered around $2f_0$. In a worst case scenario, the blocker happens to occur at a frequency $f_0$. In this worst case scenario, the actual frequencies of the blocker and the signal of interest are $LO+f_0$ and $LO+2f_0$, respectively.

If some part of the signal processing chain, be that the mixer 30, the amplifiers 40 and/or 42 or the ADC 50 exhibits second harmonic distortion, then this gives rise to harmonic generation.

If the local oscillator frequency $f_{LO}$ over time is represented as $$f_{LO}=\cos(2\pi f_{LO}t)$$

and the frequency of the blocker $f_{BLOCK}$ over time is represented as $$f_{BLOCK}=\cos(2\pi f_{LO}+f_0)t$$

then it can be shown that a harmonic of the blocker occurs at $+2f_0$ and at $-2f_0$ with respect to the local oscillator frequency $f_{LO}$. Thus, in this example, the blocker 2nd harmonic sits over the wanted signal which occurs at 2fo in the baseband.

However, the blocker second harmonic which may be known as 'HD2' by those skilled in the art is related to the blocker. If the relationship between the blocker second harmonic and the block can be estimated, then the blocker signal can be used to estimate a correction signal to reduce the second harmonic signal HD2, or indeed any desired harmonic of the blocker.

Figure 4:
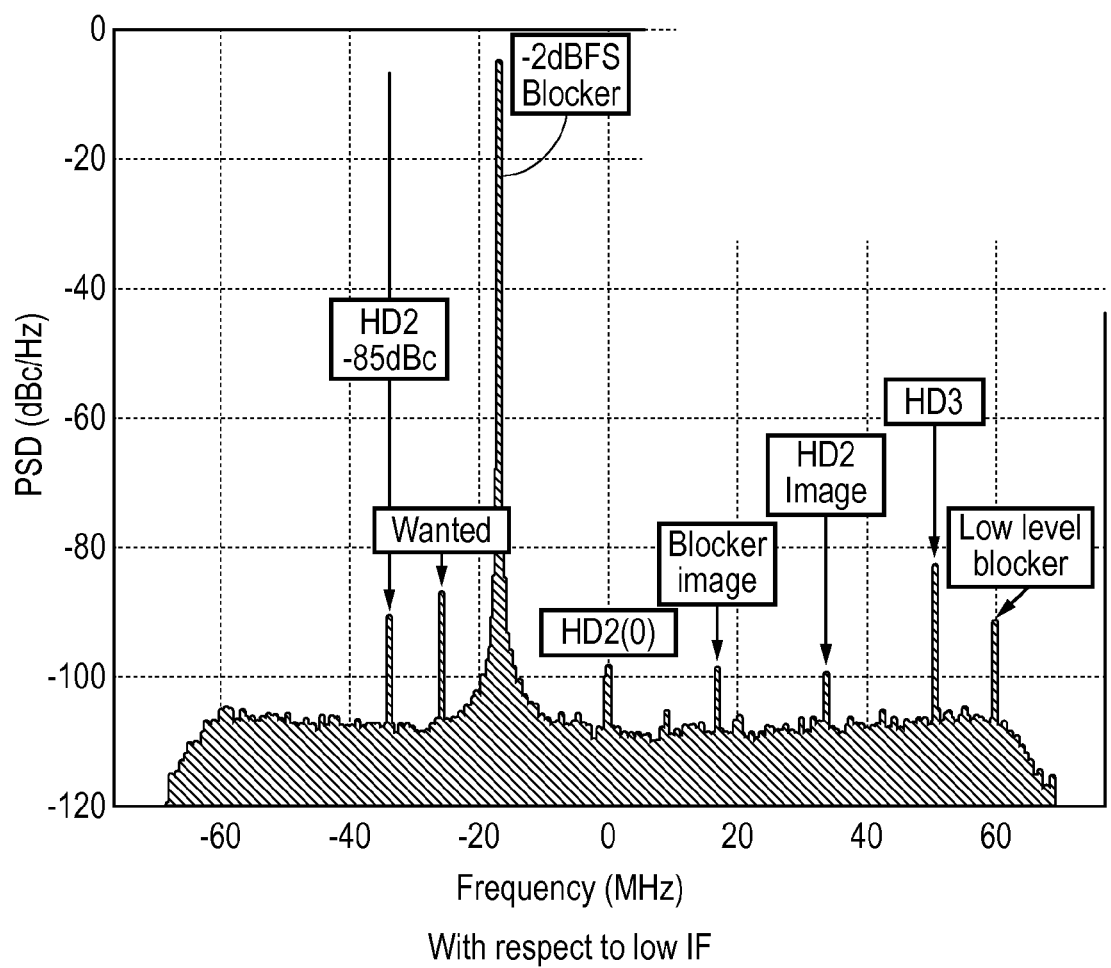
FIG. 4 is a measured frequency response from a receiver where a large blocker is present and its second harmonic substantially coincides with a signal that it is desired to be received.

FIG. 4 is a spectral diagram for a known low IF conversion receiver and ADC. The frequencies are shown with respect to the intermediate frequency which may typically be in the region of 75 MHz to 100 MHz. In FIG. 4, a blocker with a signal strength of −2 dBFS occurs at −18 MHz compared to the intermediate frequency (assuming that the local oscillator is on the low side of the incoming frequency). Second order harmonic distortion gives rise to harmonics at −36 MHz, and +36 MHz compared to the intermediate frequency. A blocker image occurs at +18 MHz compared to the intermediate frequency and a third harmonic labelled HD3 appears at +54 MHz but does not appear at −54 MHz. This is a real artefact resulting from intermodulation between the various frequencies.

Because the frequencies are shown with respect to the intermediate frequency the spectrum in FIG. 4 runs from IF−65 MHz to IF+65 MHz. If, for numerical convenience the intermediate frequency, IF, was 100 MHz, then the spectrum would extend between 35 MHz and 165 MHz.

This allows for relatively convenience selection between those frequency components in the in-band range of −60 MHz to −5 MHz compared to the intermediate frequency (i.e., +40 MHz to +95 MHz) and those components that are in an image band of +5 to +60 MHz compared to the intermediate frequency (i.e. 105 MHz to 165 MHz).

In this example, the measured in band second harmonic signal (HD2) had a power which is about 85 dB less than the blocker.

It should be noted that, in general, the output y of the ADC (or other signal processing components) in response to a signal x can be represented as $$y=a_0+a_1x+a_2x^2+a_3x^3+a_4x^4\ldots$$

In this equation, $a_0$, $a_1$, $a_2$, $a_3$, $a_4$, etc. are coefficients in a polynomial expansion representing the relative contribution of each of the polynomial terms to the output y. Distortion relating to any of these terms $a_2x^2$, $a_3x^3$, etc., and/or from intermodulation products may be estimated and reduced. However, as in the example given so far, the main source of distortion can be second order harmonic distortion. Accordingly, this case will be considered further.

Figure 5:
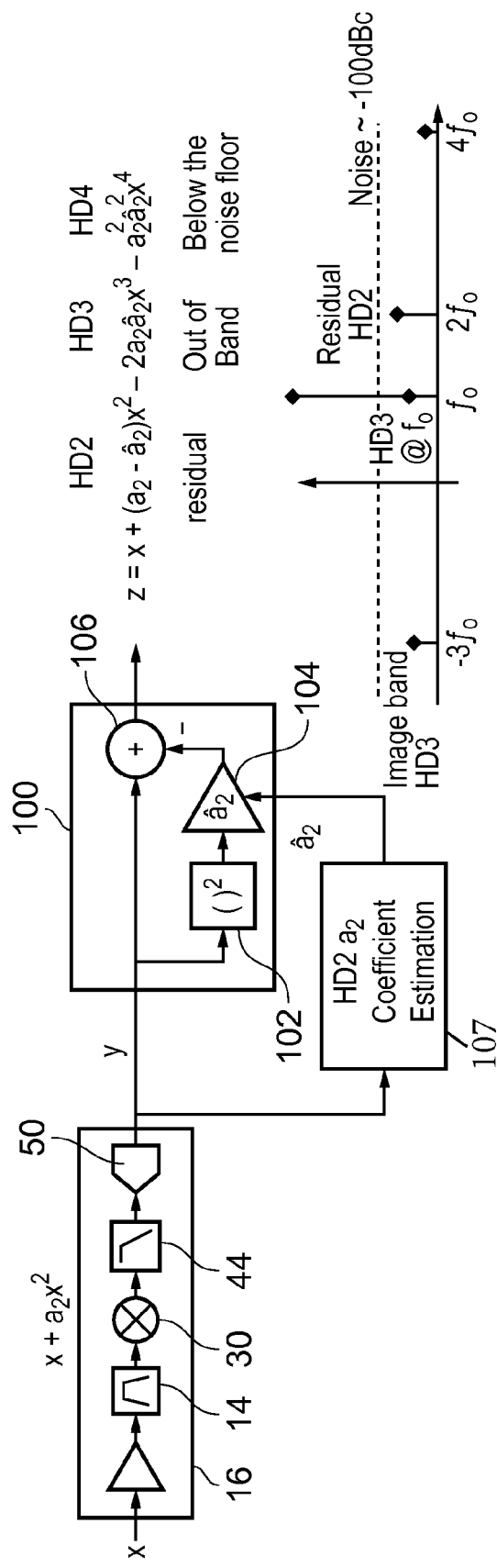
FIG. 5 is a schematic diagram of a signal processing system for reducing an unwanted harmonic signal arising from a blocker.

FIG. 5 shows a schematic representation of an apparatus that includes a second harmonic reducer 100 comprising a squarer 102, a correction signal generator 104 and an adder 106. It will be understood that reducers configured to suppress unwanted signals at other frequencies, such as other harmonics, can alternatively or additionally be implemented. Given that the second harmonic reducer 100 acts (in this example) on the digitized output of the ADC 50, then the squarer 102 can be implemented in hardware as a two input digital multiplier. The squarer 102 can serve as a first processor configured to process the output y of the ADC 50 by operating on the output y with a function that includes a term descriptive of the unwanted signal component to create an estimated unwanted signal. The output of the squarer 102 is provided to the correction signal generator 104, which receives an estimated correction coefficient $\hat{a}_2$. The apparatus can include a coefficient estimation circuit 107 configured to generate the estimated correction coefficient $\hat{a}_2$ based on the output y of the ADC 50. The coefficient estimation circuit 107 can serve as a second processor configured to process the estimated unwanted signal from the first processor and at least one of the output y from the ADC 50 or the output signal Z of the second harmonic reducer 110 to identify one or more parameters to apply to the estimated unwanted signal to generate a correction signal. The coefficient estimation circuit 107 can include a blocker detection engine and an adaptation engine, for example, as discussed below. A combiner, such as the adder 106, can combine the output of the ADC 50 and a correction signal from the correction signal generator 104 to form an output signal Z such that an influence of the unwanted signal component in the output signal Z is reduced. The sign of $\hat{a}_2$ can be negated such that adding the output of the correction signal generator 104 to the corresponding digital word from the ADC 50 at adder 106 forms a further output Z represented by the following equation:

$$Z = y + (a_2 - \hat{a}_2) y^2$$

Further analysis would show a third harmonic $HD3 = -a_2 \hat{a}_2 x^3$ out of the pass band and a fourth order harmonic $HD4 = -a_2^2 \hat{a}_2^2 x^4$ below the noise floor of the receiver.

The residual amount of the second harmonic can depend on the accuracy of estimation of $\hat{a}_2$ to reduce $a_2 - \hat{a}_2$.

Figure 6:
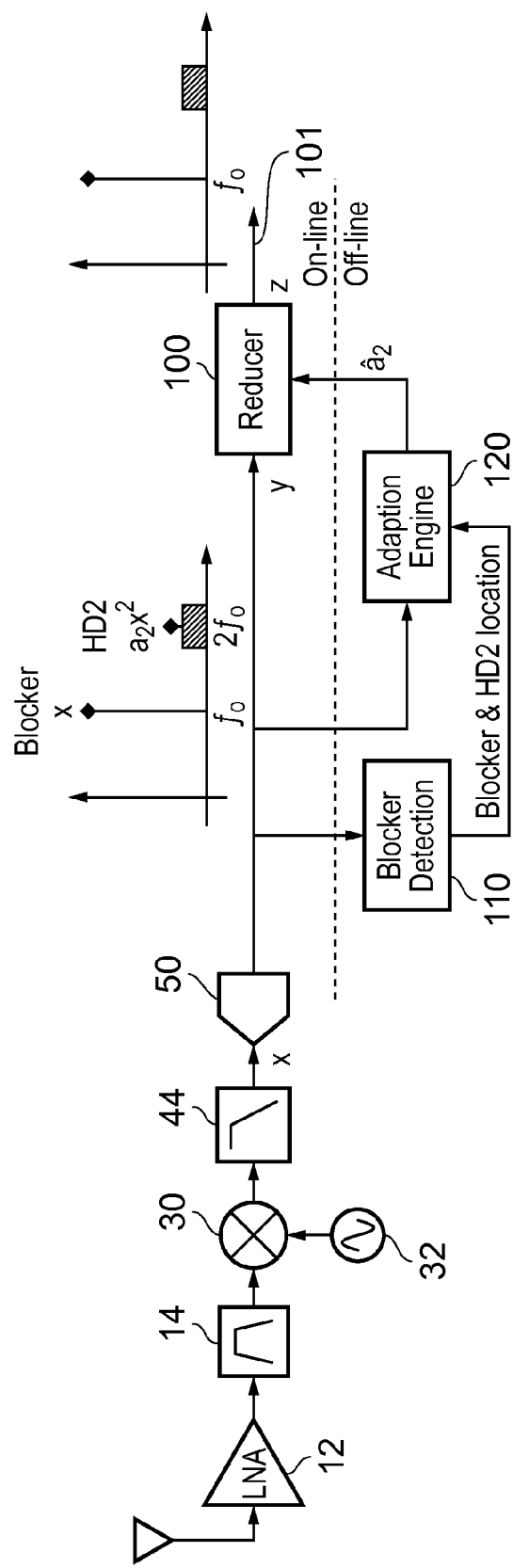
FIG. 6 shows components of the signal processor of FIG. 5 in greater detail.

FIG. 6 is a block diagram of a second harmonic reduction circuit (or "reducer") in association with a radio receiver, as might be found in a mobile receiver or a base station.

The second harmonic reducer 100 is associated with a blocker detection engine 110. The blocker detection engine 110 may be implemented in dedicated hardware, by a processor executing instructions stored in non-transitory computer-readable storage, or a combination of the same. The blocker detection engine 110 is connected to an adaptation engine 120, which may be implemented in dedicated hardware, by a processor executing instructions stored in non-transitory computer-readable storage, or a combination of the same.

The reducer 100 can run continuously while the ADC 50 is outputting data, whilst the blocker detection engine 110 and the adaptation engine 120 can be run intermittently. The output Z of the reducer 100, which represents the input data stream with a reduced unwanted signal component, is provided at output 101.

The correction signal generator 104 (FIG. 5) may be implemented as a buffer or delay line for maintaining a record of the most recent output N output words from the ADC 50. The second harmonic reducer 100 works on the in-phase and quadrature signals. Many responses or transfer characteristics may be implemented in the second harmonic reducer 100, which can be analogous in its construction to a finite impulse response (FIR) filter comprising M delay elements, such that an output p of the filter is represented by the following equation:

$$p = \sum_{m=0}^{M} \{\mathrm{Re}\{\hat{a}_2(m)\} + j\mathrm{Im}\{\hat{a}_2(m)\}\}\{I^2(n-m) + jQ^2(n-m)\}$$

and the output z of the signal processor is represented by the following equation:

$$z(n) = y(n) - a(n) \otimes \{I^2(n) + jQ^2(n)\}$$

where a represent the filter coefficients.

The designer has a choice of the number of taps or delay stages M that he implements, but M can be unexpectedly small if desired. In simulation, and subsequently in experimentation, it was found that M=2 or 3 could give sufficient performance within a mobile telephony system to adequately address baseband non-linearity. However, other circuits or corrections may desire more taps.

Figure 7:
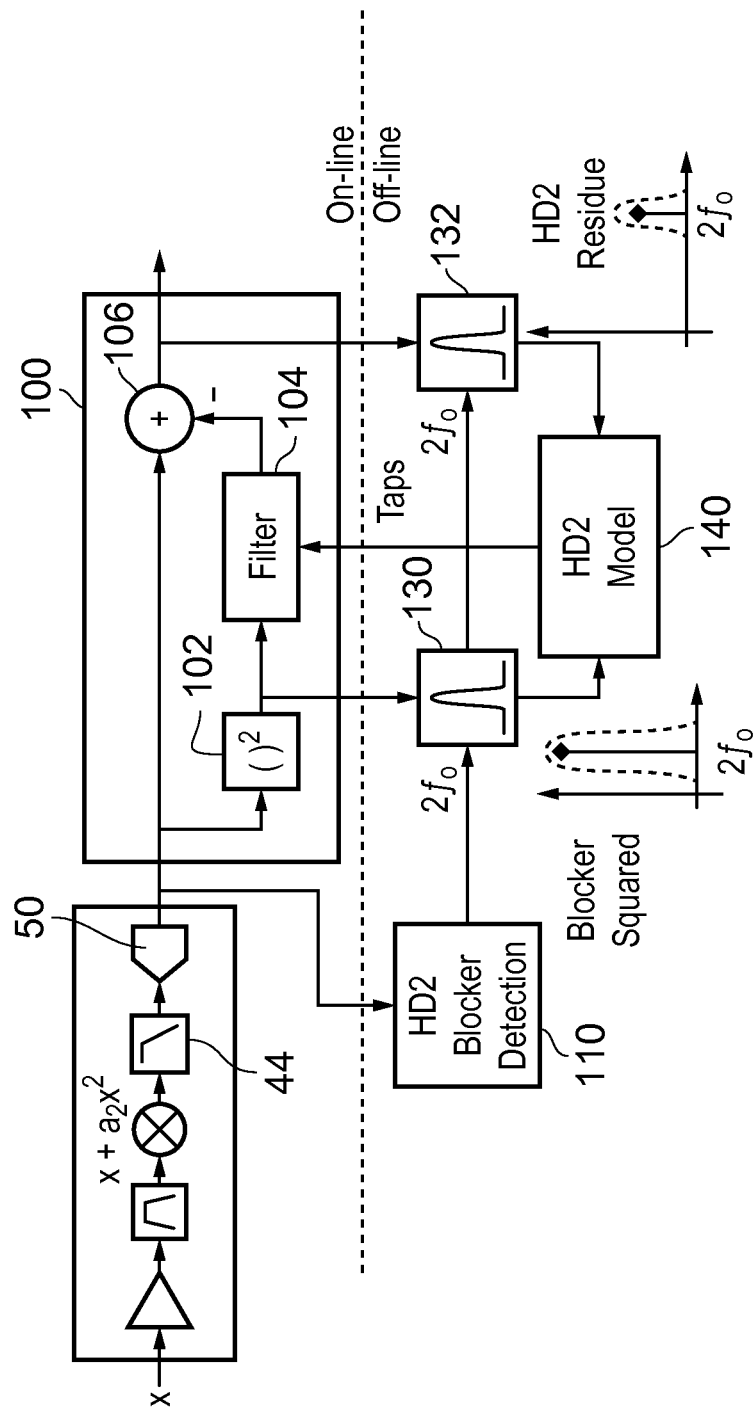
FIG. 7 shows components of an adaptation engine of FIG. 6 in greater detail.

As noted before, the second harmonic reducer 100 is responsive to an adaptation engine 120, an embodiment of which is shown in greater detail in FIG. 7.

As illustrated in FIG. 7, the adaptation engine 120 comprises tunable narrow band filters 130 and 132, which are controlled by a blocker detection engine 110, which will be described in greater detail later. The blocker detection engine 110 can set the centerband of the filters 130 and 132 at the frequency of the second order harmonic HD2.

The input signal to the correction signal generator 104 and the output of the summer 106 are therefore filtered to extract the second harmonic terms of the blocker, and this information is used to update the coefficients used in a HD2 model circuit 140 of the adaption engine 120 to set the coefficients to be applied to the taps of the correction signal generator 104. In FIG. 7, the correction signal generator 104 is illustrated as a filter. The correction signal generator 104 can be a finite impulse response (FIR) filter in certain embodiments. Such a filter can operate on both the I and Q channels, and may be a complex FIR filter (that is the filter receives both real and imaginary coefficients).

Figure 8:
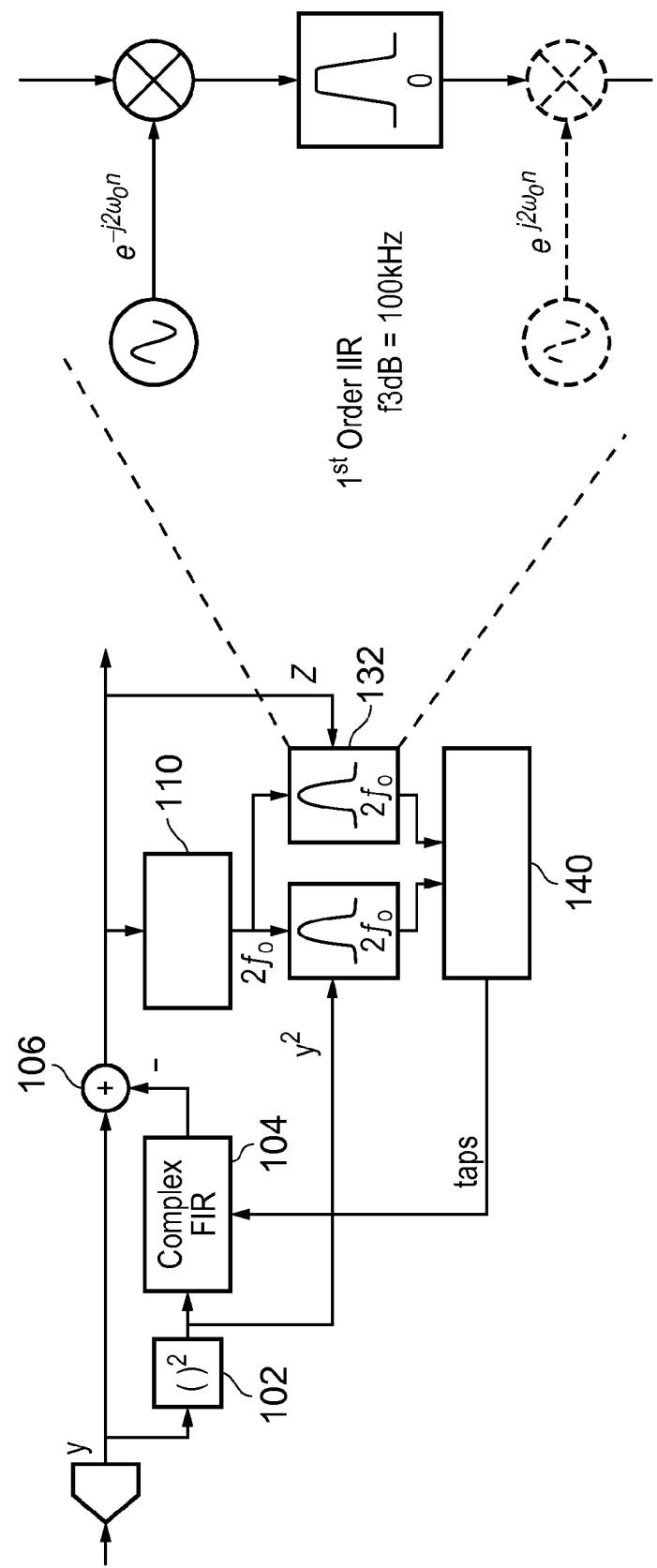
FIG. 8 shows the narrowband filters of the adaptation engine of FIG. 7 in detail.

Assuming that the frequency of the blocker signal can be estimated, then a narrow band filter can be formed by multiplying the digitized output of the ADC 50 with a filter signal having a fundamental frequency matched or substantially matched to the frequency of the second harmonic HD2 in the base band that arises from the blocker frequency. The filter signal can be formed as a digitally generated sinusoid (which may be represented as a complex number) and the multiplication, and hence mixing, can be performed in the digital domain. In some embodiments the filter signal can be implemented as a nominal square wave having magnitudes of +1 and −1. This can allow the down conversion to be performed by a cyclical inversion of a sign bit. This multiplication and down conversion to DC is schematically illustrated in FIG. 8.

The second harmonic HD2 (e.g., an I+jQ vector of samples corresponding to the signal content at the frequency HD2, in which j represents the square root of negative one) is therefore down converted to DC or near DC values and then filtered by narrow band filters 130 and 132. The narrow band filters 130 and 132 may be implemented as infinite impulse response filters, which can be arranged to give narrow band filter responses with only a few delay stages.

Notionally the filtered signal should be up converted back to HD2 by a further multiplication by the filter frequency, but the inventor realized that instead of the further multiplication, the filter signal can be converted back to HD2 in a matrix and vector processing operation that can be performed periodically as opposed to continuously and in real time.

The adaptation engine 120 may be implemented in any suitable dedicated hardware and/or by a processor configured to execute instructions stored in non-transitory computer-readable storage. An example of the adaptation engine 120 will now be described.

Figure 9:
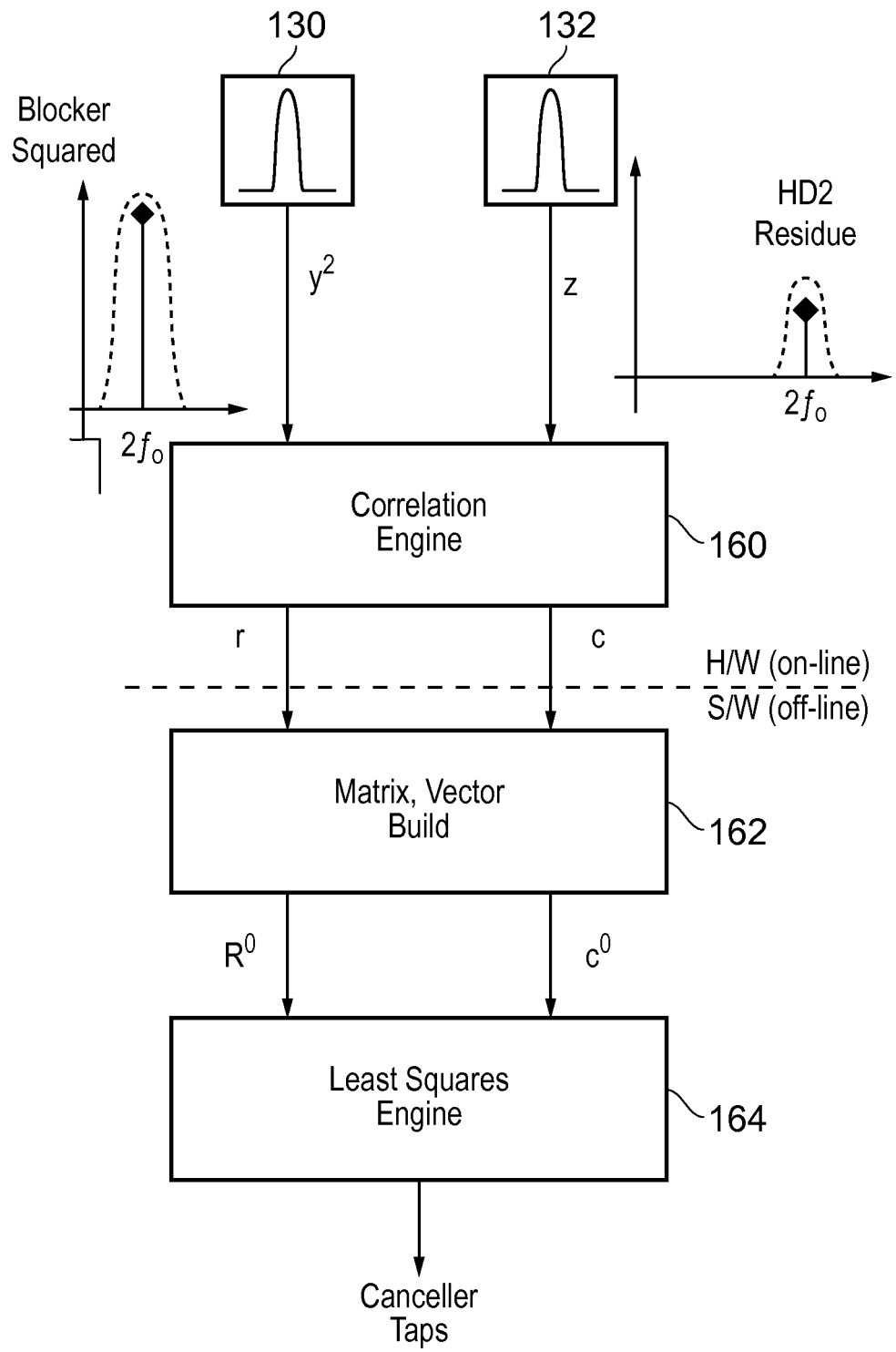
FIG. 9 shows further features of the adaptation engine of FIG. 7 in greater detail.

The adaptation engine 120 may be implemented in three sub-systems, as shown in FIG. 9. The sub-systems may comprise a correlation engine 160, a matrix and vector build engine 162 and a least squares engine 164.

The correlation engine 160 may comprise a buffer or memory so as to hold N samples. In hardware, the buffer may be implemented as an N stage shift register. Alternatively, the correlation engine can dispense with a buffer and process the sequence of samples as they arrive one by one.

Each buffered value or sample may be provided to a plurality of multipliers and summers arranged to form the desired autocorrelation and cross correlation functions.

Figure 10:
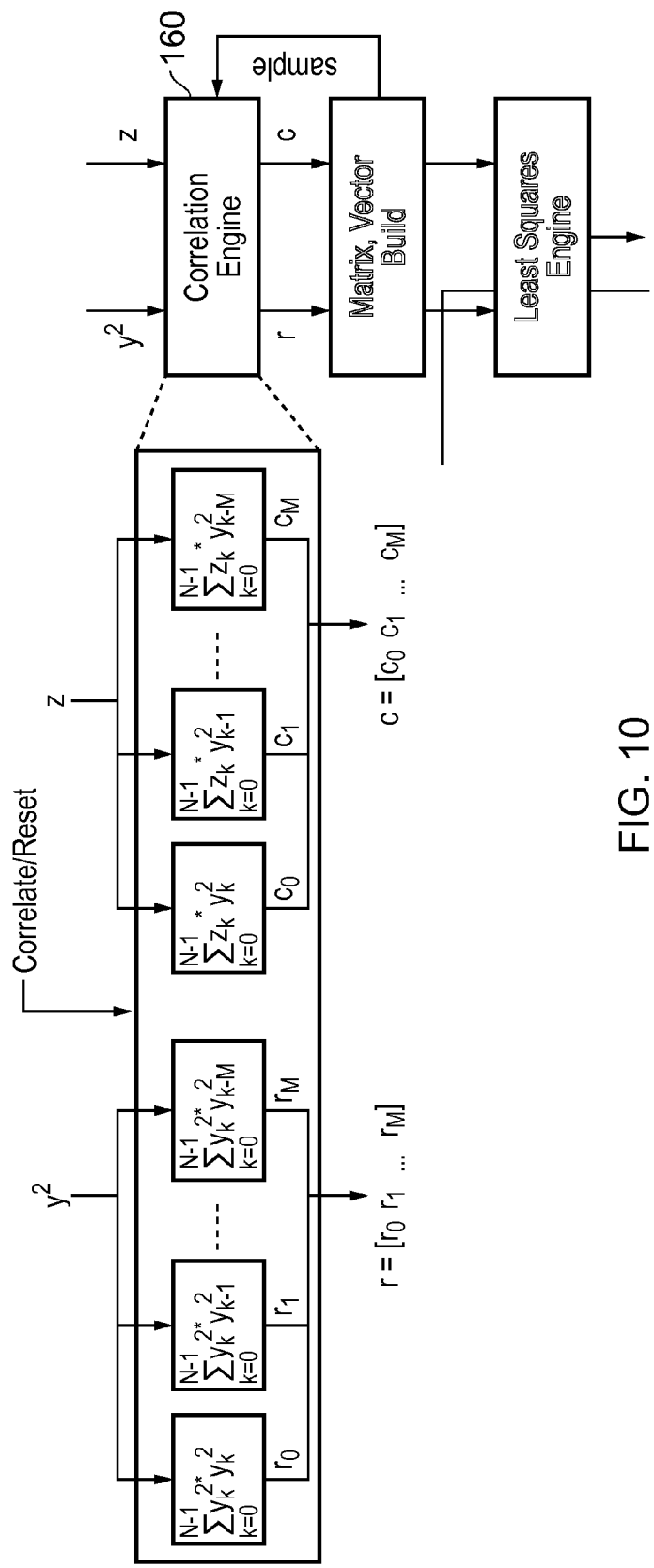
FIG. 10 shows the operation of the correlation engine of FIG. 9.

Thus, as shown in FIG. 10, the values from buffer can be supplied to a series of multiplier and summers arranged to form auto-correlation products $r_0$ to $r_m$ $$r_0 = \sum_{K=0}^{N-1} y_K^{2*} y_K^2$$

$$r_1 = \sum_{K=0}^{N-1} y_K^{2*} y_{K-1}^2$$

$$r_2 = \sum_{K=0}^{N-1} y_K^{2*} y_{K-2}^2$$

$$\vdots$$

$$r_m = \sum_{K=0}^{N-1} y_K^{2*} y_{K-m}^2$$

where * represents a complex conjugate n represents the number of samples in the buffer m represents the number of taps/delay stages in the FIR filter Similarly, the cross correlation products can be formed by dedicated hardware (or by a processor configured to execute instructions stored in non-transitory computer-readable storage) configured to process the N samples to calculate cross-correlation coefficients $c_0$ to $c_m$ $$c_0 = \sum_{K=0}^{N-1} z_K^* y_K^2$$

$$c_1 = \sum_{K=0}^{N-1} z_K^* y_{K-1}^2$$

$$c_2 = \sum_{K=0}^{N-1} z_K^* y_{K-1}^2$$

and so on.

The output of the correlation engine 160 is an auto-correlation vector r and a cross correlation vector c where
r=[$r_0$, $r_1$, $r_2$ ... $r_m$]
c=[$c_0$, $c_1$, $c_2$ ... $c_m$]

As shown in FIG. 10, the correlation engine 160 is responsive to an instruction to sample the most recent N instructions, here labelled 0 to N−1, in response to signals from the matrix and vector build engine 162. The sampling and vector build can be performed by the vector build engine 162 relatively infrequently. For instance, such sampling and vector building may be done once per slot in a GSM system.

Figure 11:
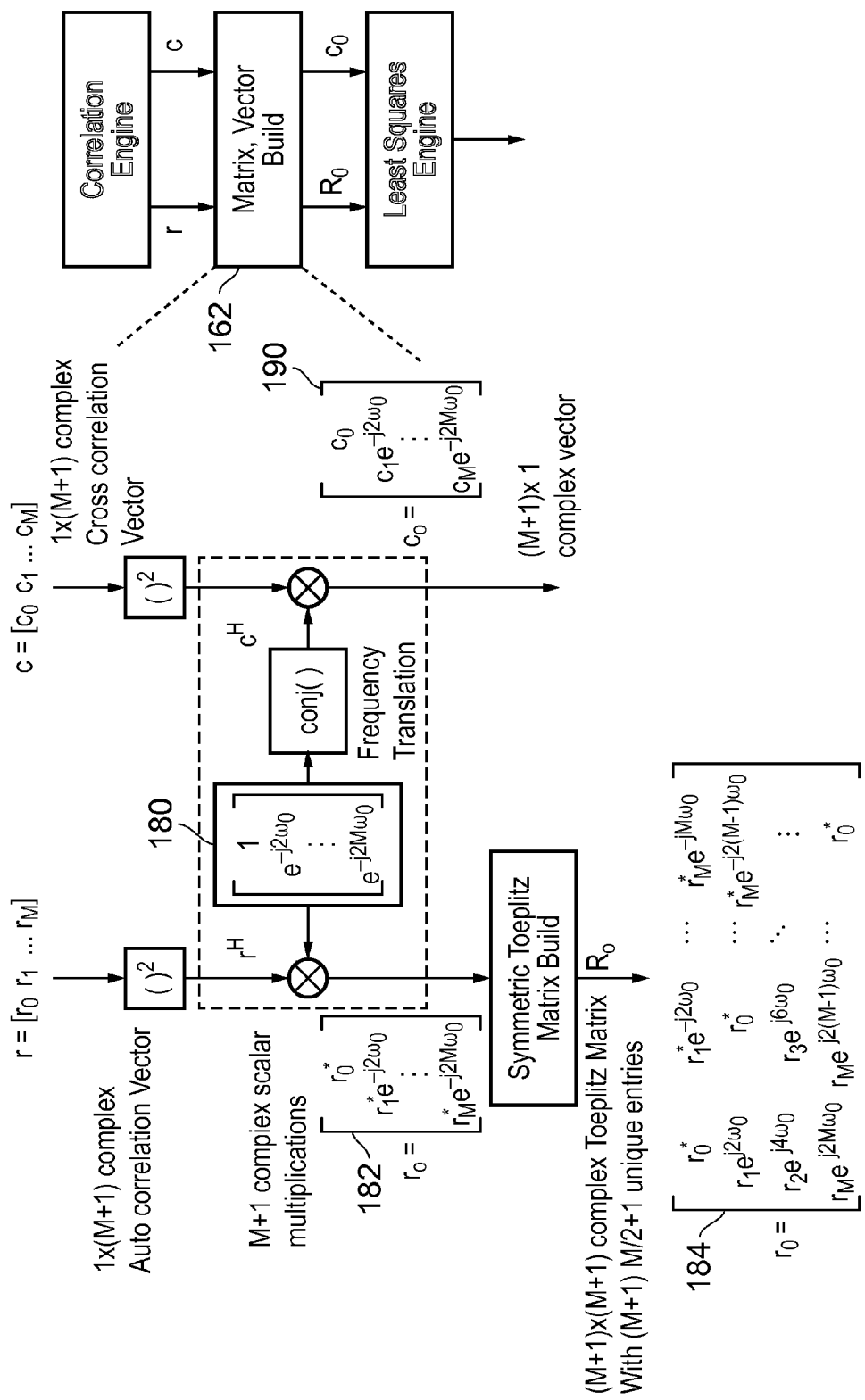
FIG. 11 shows the operation of the matrix and vector build engine of FIG. 9.

FIG. 11 schematically illustrates the operations undertaken in the matrix and vector build engine 162.

As shown in FIG. 11, the matrix and vector build engine 162 receives the autocorrelation vector r and cross correlation vector c. The matrix and vector build engine 162 can operate on the received vectors to form respective Hermitian matrices (also known as self-adjoint matrices) where an element in the $I^{th}$ row and $J^{th}$ column of the matrix is equal to the complex conjugate of the element in the $J^{th}$ row and $I^{th}$ column of the matrix for all indices I and J. Hermitian matrices have eigenvalues that are always real. The Hermitian matrices are then frequency transposed by multiplication with respective complex scalar functions. At block 180, the frequency translation vector is defined as [1, $e^{-j2\omega_0}$ ... $e^{-j2M\omega_0}$]. The frequency translation vector 180 is multiplied with the autocorrelation Hermitian matrix $r^H$ to form a vector $r_0$ designated 182 in FIG. 11, and then built into a Toeplitz matrix, represented by matrix 184 in FIG. 11. Similarly, the frequency translation vector 180 is used to operate on the cross correlation products, but here its complex conjugate is formed and this is multiplied with the Hermitian matrix of the cross correlation products to form vector $c_0$, designated 190. The frequency translation operation resulting from use of the frequency translation vector takes the place of the up-conversion discussed with respect to FIG. 8, and allows a real-time complex multiplication to be replaced with a relatively low rate (e.g., around once per millisecond) offline calculation.

Figure 12:
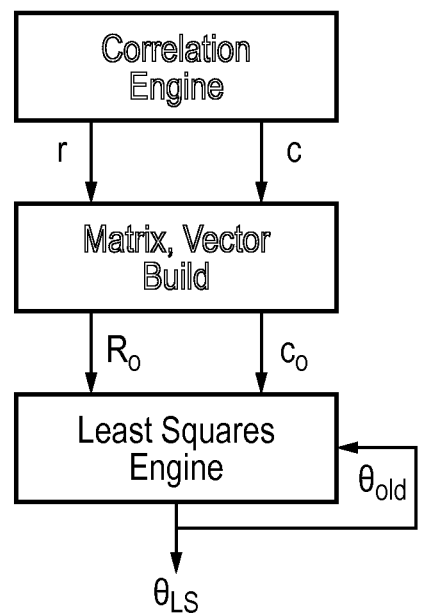
FIG. 12 shows the operation of the least squares engine of FIG. 9.

The vector $c_0$ and the matrix $r_0$ are then passed to the least squares engine 164, which performs an iterative estimate of the filter coefficients by updating old values of the filter coefficients with correction values formed by inverting the regularized autocorrelation matrix $\{r_0+\lambda I\}$ where $\lambda$ (lambda) is a scalar real constant and I is the identity matrix of dimension M+1, and premultiplying this inverse by the cross correlation vector $c_0$, and the result being scaled by a real positive scalar value $\mu$ as shown in FIG. 12. The value of $\mu$ allows the rate of convergence to be controlled so as to maintain stability. Such a technique is well known to the person skilled in the art and available via standard numerical packages, such as Matlab, and also in libraries for use with embedded systems.

Having estimated new coefficients from the least squares fitting with the least squares engine 164, these are then provided to the second harmonic reducer 100 in order to reduce the second harmonic interference.

In tests, the system has been shown to work very well even when the wanted signal and the second harmonic are superimposed in the frequency space. Under such conditions, the wanted signal is uncorrelated to the second harmonic HD2, and therefore could be regarded as noise or interference that the adaptation algorithm has to overcome, thus the wanted signal actually retards but does not prevent convergence of the adaptation algorithm. In tests, HD2 was set to have a power of approximately −85 dBFS (−110 dBm) whereas the wanted GSM signal (or other communications signal) might have a power between −101 dBM to −88.5 dBm. Thus, this gives an adaption signal to a noise ratio of −21.5 dB to −9 dB. In testing, this approach has been able to achieve a cancellation gain of better than 10 dB. This was achieved with filters having M=4, thus such filters are relatively short and easy to implement in hardware, and simulation work suggests that M can be reduced to unity.

The technique described here can be used to reduce distortion resulting from non-linearity in receivers, such as the introduction of a square term as a result of operation of the analog to digital converter. However, the approach is "blind" to the source of the distortion. Thus, it is also applicable to reduce blocker signals that originate from outside of the receiver, as might be encountered if a "rogue" transmitter, such as a mobile telephone handset which is not performing within its design limitations and is generating out of channel signals that drown out adjacent channels. When using this technique to address RF non-linearities, it is not limited to only 2nd order harmonics, but can also deal with 3rd, 4th, 5th and so on order effects.

Returning to FIG. 6, part of the adaptation process involves identification of the blocker signal. The blocker signal was shown in FIG. 4 as being the strongest signal peak in the passband at the output of the analog to digital converter 50. For simplicity, only one blocker is shown, but in reality there may be several signals which are potentially the blocker, although one will almost inevitably be stronger than any of the others and this primary blocker is the signal which can be located and corrected for. As is known to the person skilled in the art, the presence of such a signal can be located by frequency analysis techniques, such as the use of Fourier transforms. Such techniques may be used here. However, for the sake of completeness, two iterative techniques which are the subject of U.S. patent application Ser. No. 14/517,447, filed Oct. 17, 2014, the entire technical disclosure of which is hereby incorporated by reference, will be described here.

Figure 13:
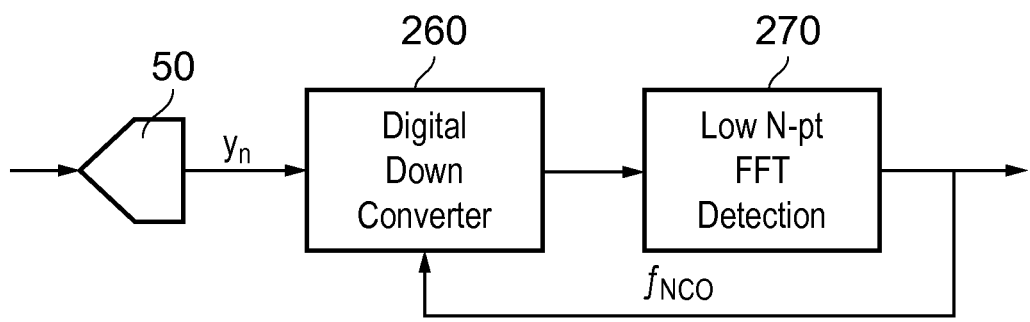
FIG. 13 is a schematic diagram of a circuit operable to search for blocker signals or components resulting from the presence of a blocker signal.

FIG. 13 is a block diagram of a signal processing system arranged to find a dominant signal, such as a blocker signal or HD2 component within a bandwidth limited signal.

In the arrangement shown in FIG. 13, the functions implemented within the signal processing system are described in terms of hardware, although it should be evident that since all the operations are being performed on digital words, the operations may be performed in dedicated hardware, or reusable/multipurpose computational engines and/or by a processor configured to execute instructions stored in non-transitory computer-readable storage. Further, several of the functional blocks described here may be performed by a single device. The output of the analog to digital converter 50 is provided to a down converter 260, and the output of the down converter 260 is provided to a spectral analysis engine 270, such as a low N point fast Fourier transform engine which may be implemented in dedicated hardware or by a processor configured to execute instructions stored in non-transitory computer-readable storage. Similarly, the down converter 260 can also be implemented in dedicated hardware or by a processor configured to execute instructions stored in non-transitory computer-readable storage. The output of the spectral analysis engine 270 is then fed back to control the operation of the digital down converter 260. The circuit of FIG. 13 is shown in greater detail in FIG. 14. The digital down converter 260 comprises a multiplier 262 that receives an input signal, which in this example is a digital sequence output by the analog to digital converter 50 at a sampling rate Fs to a first input of the multiplier 262. A second input of the multiplier 262 receives an oscillating signal from a digital oscillator 264. The digital oscillator 264 may be arranged to produce a digital signal having a fundamental frequency set to equal a demanded frequency determined by the spectral analysis engine 270. The output of the digital oscillator 264 may approximate a sinusoid, and in which case a calculating engine may be provided in order to synthesize the sinusoid at an appropriate frequency. The sinusoid may be represented as a complex entity. Alternatively, a reduced resolution sinusoid may be held in read only memory, and interpolation may be used in order to synthesize an appropriate sinusoid at the appropriate frequency. In a further alternative, the output of the digital oscillator 264 could simply be a square wave such that the output of the analog-to-digital converter 50 is multiplied by 1, and then by −1, in an alternating sequence having a fundamental frequency set to an appropriate demanded frequency. This approach can be used because higher order harmonics can be rejected by a filter 266 arranged to receive the output of the mixer 262.

It will become evident from the description below that the demanded frequency can match one of the bin frequencies of the FFT engine at each iteration, and hence can be estimated in advance. Consequently, action may be taken to preload one or more sequences for generating the digital sinusoid into a sinusoid memory. In any event there are several approaches known to the person skilled in the art of providing a numerically controlled oscillator.

If the digital oscillator 264 has a frequency $F_{NCO}$, then as known to the person skilled in the art, signal components are frequency shifted by $F_{NCO}$ in the down converter 260. Thus, the action of the down converter 260 is to move the frequency of the incoming signal to be centered around $F_{NCO}$. This can be exploited to implement a search of a frequency space.

As is known to the person skilled in the art, the Fast Fourier Transform (FFT) operation (and indeed frequency analysis operations in general) examine an incoming signal and allocate its components to "bins". The magnitude of a signal allocated to a bin is representative of the signal strength in the frequency range belonging to the particular bin. In principle a FFT of the incoming signal could be performed to identify the frequency of the dominant signal with a desired degree of accuracy, which can be predetermined. However this can rapidly become computationally expensive and time consuming.

It was realized that a relatively simple search could be made through a frequency space to identify a range of frequencies where the dominant signal is likely to be. For example with a 2-point Fourier transform the frequency space is divided into a top half and a bottom half. With a 3 point Fourier transform the frequency space is divided into three regions and so on. In a first iteration an entire search band is interrogated at a first resolution. The first resolution corresponds to a first "bin" width. Once a region containing a signal has been identified, which region can be regarded as a candidate region, then the search space can be reduced to cover the frequency range of at least the candidate region and preferably is centered about the mid-frequency of that candidate region or bin. In a second iteration this reduced search space is interrogated, but the number of bins used to search this reduced space remains the same. Thus the bin width is reduced—or put another way the resolution is increased. The bin containing the largest signal component is identified and becomes the center of a reduced search space for the next iteration, and so on. In order to achieve this approach a simple and robust way of defining the search space at each iteration is desired. This is achieved by the digital down converter 260 that includes a filter.

Figure 14:
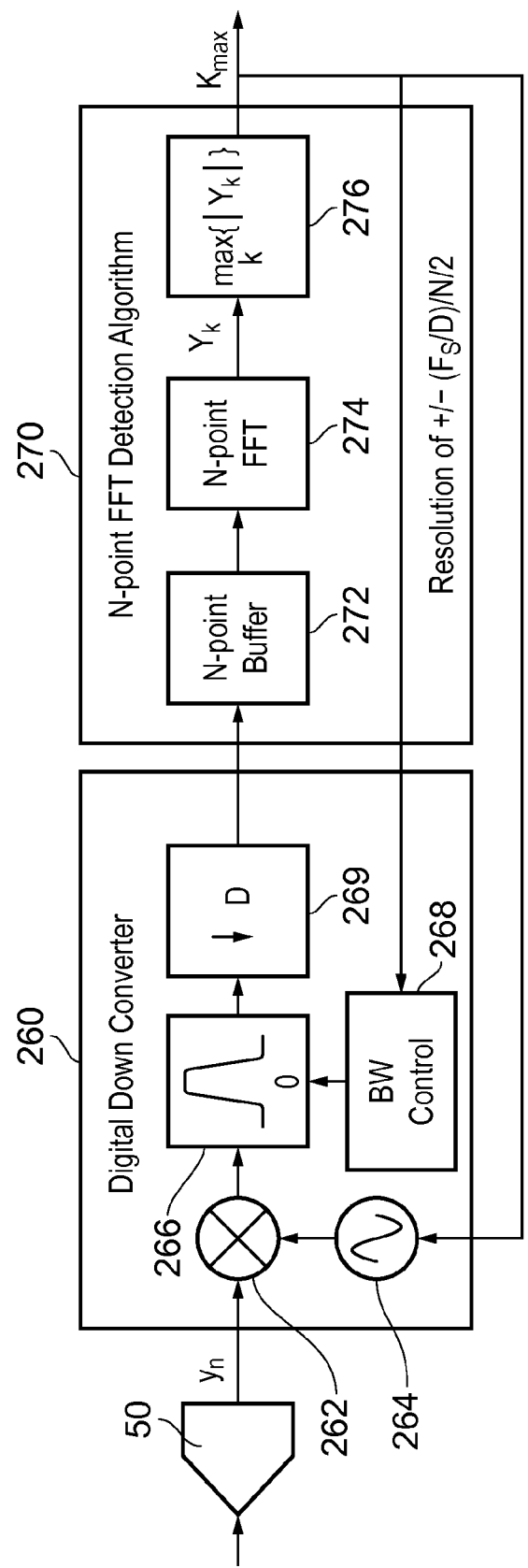
FIG. 14 shows the apparatus of FIG. 13 in greater detail.

In FIG. 15, the output from the mixer 262 is passed to a narrow band filter 266 which, because of the operation of the digital down converter 260, can have a single center frequency from one iteration to the next, but whose bandwidth is variable from one iteration to the next in response to bandwidth controller 268. The output of the narrow band filter 266, which is a digital filter in FIG. 14, is then provided to a decimator 269 which is operable to decimate the data stream by a controllable decimation factor D. The bandwidth of the narrow band filter 266 can be controlled by the bandwidth controller 268 such that it passes the entirety of the bin selected as having the maximum magnitude in the most recently performed FFT analysis. It may also be arranged to pass a guard band disposed around the bin selected for further spectral analysis.

As a result of the down converter 260, a frequency range of interest can be down converted such that the range to be investigated in the incoming signal $Y_n$ is delivered to a known frequency space by the down converter. For example the frequency range of interest could be converted such that its lowest frequency maps to a predetermined frequency in the down converter 260, such a frequency may for example be approximately 0 Hz. Alternatively, the mid-point of the frequency range may be mapped to a predetermined frequency such as the mid-point of the narrow band filter 266. In any event, the frequency of the down converter is selected such that the frequency range of the candidate region is transformed to lie within the pass band of the filter 266.

The spectral analysis engine 270 in this example comprises an N point buffer 272 which keeps a record of the most recent N words output by the decimator 269. The output from the N point buffer 272 is provided to an N point FFT engine 274 which, as known to the person skilled in the art, divides the frequency space of interest into N bins and allocates signal strengths to each of the bins. The bins are designated $Y_K$. The outputs of N point FFT engine 274 is provided to a selector circuit 276 which, as illustrated, identifies the bin $Y_K$ having the largest signal modulus therein. Once the bin $Y_K$ having the largest signal modulus been identified, the center frequency of this bin can be calculated by the algorithm and used to set the frequency $f_{NCO}$ of the digital oscillator 264 in a subsequent iteration. As is known to the person skilled in the art, the Fourier transform can be performed in hardware, and Analog Devices, Inc. of Norwood, Mass. has a forty-eight point FFT engine available. Therefore providing a smaller FFT engine that works, for example, on 16, 10, 8, 4, 3 or 2 points can be implemented by one of ordinary skill in the art. Therefore the specific implementation of the FFT engine need not be discussed further.

Figure 15A:
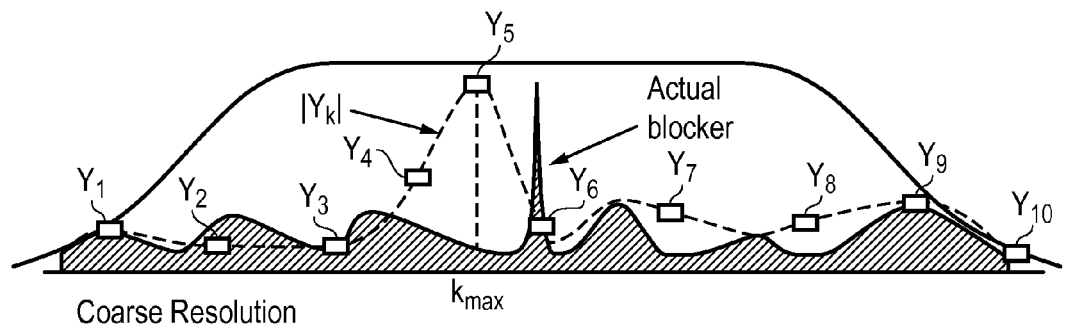
FIGS. 15a to 15c show an example of a frequency search.
Figure 15B:
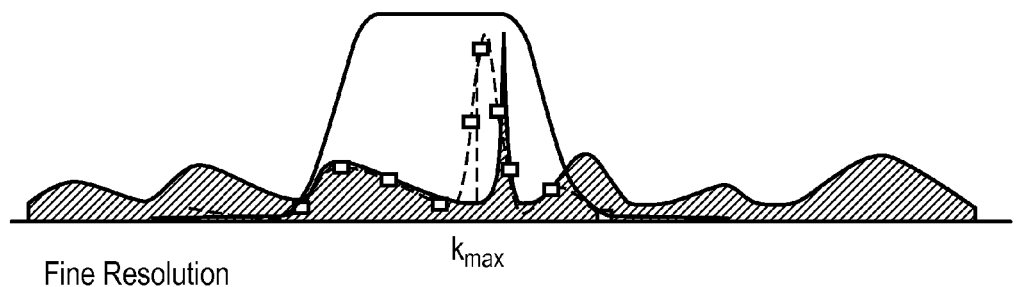
Figure 15C:
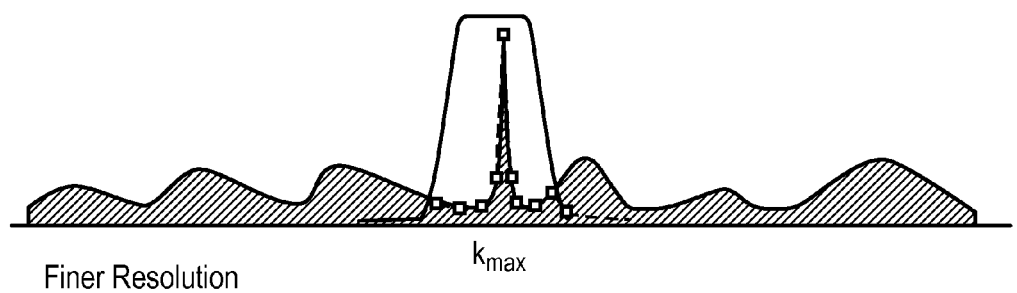

Operation of the circuit of FIGS. 13 and 14 will now be described with reference to FIGS. 15a, 15b and 15c. For convenience 10, bins have been shown in each of these figures. It is assumed that, in a first iteration, the N point buffer is flushed, then allowed to fill with samples which have been decimated by a first decimation factor D. The first decimation factor may be unity such that every sample is passed through to the buffer until the buffer is full. Also, at the first iteration the digital oscillator 264 may not be running, and the bandwidth of the narrow band filter 266 is set to its widest bandwidth such that the entire pass band is presented to the FFT engine 274. The spectral power across the full spectrum is then allocated by the FFT engine 274 to one of a plurality of frequency buckets having center frequencies $Y_1$ to $Y_{10}$ in FIG. 15a extending between a lower frequency $LF_K$ and an upper frequency $UF_K$.

Because the illustrated frequency spectrum includes not only the most significant blocker, but other signals as well, the peak signal power ought to correspond to the bin that the blocker is in, but it could also potentially correspond to an adjacent bin. Thus in FIG. 15a, bin $Y_5$ is selected as the bin having the most signal power although in this graphical example the blocker nearly coincides with bin $Y_6$.

The frequency corresponding to frequency bin $Y_5$ in the first pass (K=1) is estimated and set as the new frequency for the digital oscillator 264. This has the effect of centering the narrow band filter 266 substantially around the frequency corresponding to bin $Y_5$. At this point, the bandwidth of the narrow band filter 266 may also be reduced such that it covers at least the width of bin $Y_5$ from FIG. 15a. In this example the pass band of the filter encompasses the frequency range of bins $Y_4$, $Y_5$ and $Y_6$. The decimation factor may now be increased by a factor between 2 and N in order to increase the resolution of the FFT engine 274. This extra bandwidth can be considered as being as being a guard band. The width of the guard band may be selected by the user or the designer and could be reduced or expanded.

The decimation factor may be user or designer adjustable. Ideally, the decimation factor should be chosen to satisfy the Nyquist sampling criteria (sample rate greater than twice the maximum frequency) in order to avoid frequency aliasing.

As known to the person skilled in the art, the frequency resolution, Fres, of a fast Fourier transform is $$Fres = +/- 0.5 \frac{F_s}{N}$$

Put another way, the frequency bin size is $$\frac{F_s}{N}$$

where $F_S$ is the sampling frequency which is ideally selected to be fast enough in order to satisfy the Nyquist sampling criteria.

Because of the action of the digital down converter 260, the frequency range of interest in each successive iteration, K, is substantially centered around direct current (DC) or the center frequency of the narrow band filter 266 (at the designer's choice) and becomes narrower and narrower. Therefore the sample rate can be reduced at each iteration, and this can be done by increasing the decimation factor. The resolution of the second iteration, as shown in FIG. 3b, is $$+/- 0.5 \frac{F_s/D}{N}$$

The bin size decreases as D increases and hence the error between the bin center frequencies and the actual blocker frequency can also decrease. Once again the maximum value of each bin can be estimated to locate a new candidate bin and the digital down converter frequency can be adjusted to set the bin center frequency the mid-point of the pass band of the narrow band filter 266 and the bandwidth of this filter can be further reduced. Thus, as shown in FIG. 15c at the third iteration, an error between the actual blocker frequency and the estimated frequency of the blocker is reduced relative to the first and second iteration, and in this instance can be regarded as falling within an acceptable error value.

It is thus possible to identify interfering or unwanted signal components, to estimate their contribution to a signal and to reduce the influence or effect of the unwanted signal.

Figure 16:
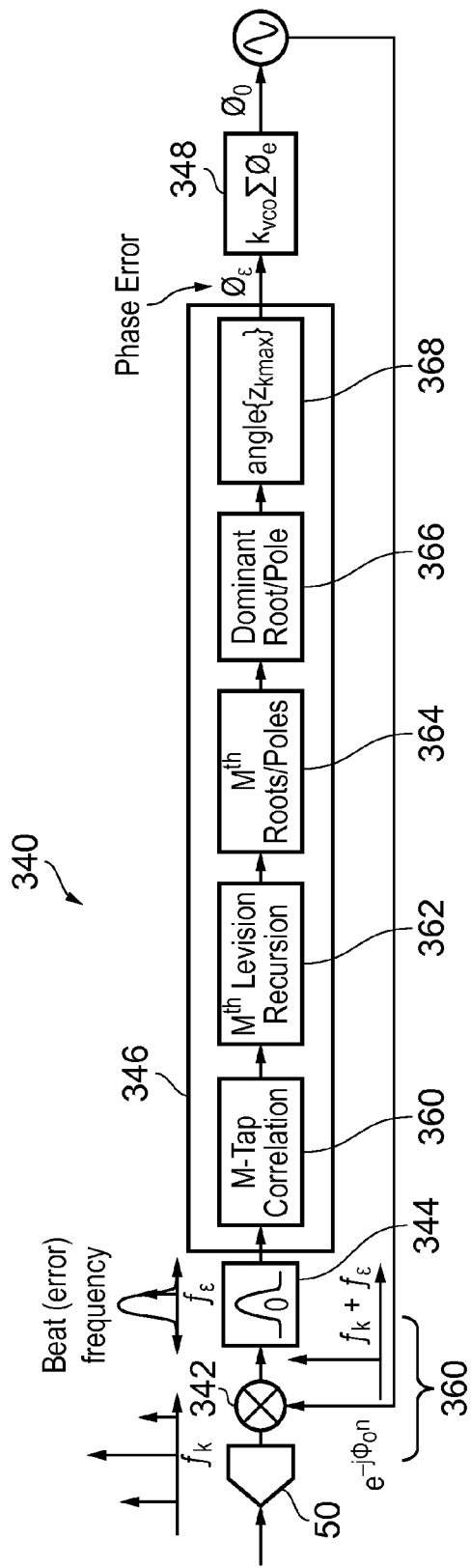
FIG. 16 is a schematic diagram of a parametric engine that can be used to identify a blocker signal.

FIG. 16 schematically illustrates an embodiment of a further apparatus for identifying the frequency of a blocker signal. The apparatus receives a digitized input signal, which may be received from one of the analog to digital converters, for example converter 50 as shown in FIG. 1 or FIG. 2. The apparatus shown in FIG. 16 comprises a blocker detector 340 which, as illustrated, comprises a digital mixer 342, a digital filter 344, a parametric engine 346, a digital integrator 348, and a digitally controlled oscillator 350. The mixer 342, filter 344, integrator 348 and digital oscillator 350, may be provided as hardware components or software components that are executable by a processor, or a mixture of the two. For the purposes of the description, they will be described as if they were physical components, but it should be realized that the entirety of the features of the blocker detector 350 can be implemented by software that is executable by a processor, such as a digital baseband processor of a base station.

The parametric engine 346 may comprise several functional blocks. In the example shown in FIG. 16 the parametric engine comprises 346 an M tap correlator 360 which receives a plurality of digital words that have passed through the filter 344. The M tap correlator 360 buffers the words and performs an auto-covariance or autocorrelation function on them. The output from the M tap correlator 360 is passed to a suitable processing engine, such as an Mth order Levinson recursion engine 362 of FIG. 16, which may be implemented in a processor and which is operable, as will be described hereinafter, to output M positions of poles in a pole-zero S plane diagram or more strictly as we are dealing with a sampled data system, the position of poles in the Z plane. In FIG. 16, this data is schematically output from an Mth poles block 364, and then examined to find the position of the dominant pole by a dominant pole block 366. The phase angle of the dominant pole can be calculated by an angle calculator 368 and output as a phase error $\phi_e$ and provided to the integrator 348. As illustrated, the integrator 348 integrates the phase error $\phi_e$ to obtain a phase correction signal which is provided to the digitally controlled oscillator 350 (also known as a numerically controlled oscillator) to change its frequency. The digitally controlled oscillator 350 outputs a numerical representation of a sinusoidal signal, and hence this just represents a run of numbers that represents approximations or samples of a sinusoid. This digital representation of a sinusoid can be multiplied with the digital representation of the input signal to obtain frequency mixed components exactly as would be the case had this all been done in analog circuitry. Thus the digitally controlled oscillator 350 and the digital mixer 342 can be implemented by digital circuitry. The output of the digital mixer 342 is provided to the digital filter 344 which may be provided as a finite impulse response filter or an infinite response filter as appropriate. The digital filter 344 may have an adjustable center frequency or, as is the case in this example, may be set to have its pass band centered around a particular frequency such as 0 Hz, but to have its bandwidth controllable so as to vary the bandwidth between successive iterations of the blocker detection circuit or algorithm.

Given a time sequence of data, it is possible to identify the presence of potential blockers using a parametric model. Thus given a sample of N points held in a buffer, it is possible to parameterize the response of a system that has an output that approximates the sample of N points.

In fact, the response can be modelled, for example, as an auto-regressive model. An auto-regressive model views a random signal as the output of a linear time invariant system to an input which is a white noise signal. The linear time invariant system is an all pole system.

There are known powerful mathematical techniques, such as the Yule-Walker equations, that can help relate the autoregressive model parameters to the auto-covariance (or auto-correlation) of the random process. If the process has a zero mean value, then the autocorrelation and the auto-covariance are the same.

Given data Xm which represents a time sequence, it is possible to estimate the autocorrelation values for that data. Then using these values it is possible to find the linear regression parameters $\alpha_L$ for L=1 to M where M is the order of the autoregressive model.

A problem with the Yule-Walker equations is that they give no guidance on the value of M that should be used. However, large M can be avoided due to computational overhead. There are several signal processing libraries which contain routines for quickly and robustly solving the above equations. They are available in algorithm form, and for embedding in to gate or processor logic. An example of a library that is well known in the personal computing environment is MATLAB, where the function is available using the command ARYULE.

However, the user still has to decide the order of the model.

The Yule-Walker equation can be solved relatively quickly for low values of M, but the computational cost of inverting the matrix increases rapidly with increases in M. This can be seen by comparing the complexity of inverting a 2×2 matrix and a 3×3 matrix using techniques such as elementary row operations (which is intuitive rather than formulaic) or using the technique of calculating minors, cofactors and adjugate (or adjoint) matrix, which is a deterministic four operation process (calculate matrix and minors, turn that into a matrix of cofactors, then form the adjoint matrix, and multiply by 1/determinant).

Numerical methods exist, but the computational overhead increases significantly with the order.

The Levinson algorithm can be used to solve the Yule-Walker equations recursively. The Levinson algorithm is an example of an algorithm that can efficiently extract the coefficients for an autoregressive model. The Levinson algorithm is also available in library form so can be used without an understanding of its derivation.

Other numerical techniques or algorithms may also be used, such as the Bareiss algorithm, Schur decomposition and Cholesky decomposition. Other techniques also exist.

In the context of a telecommunications system, a signal to be received may be in the presence of many signals which may interfere with the reception of a wanted signal. These other signals are often known as interfering signals, interferers, blocking signals or blockers, and as noted before it would be advantageous to know of the presence of blockers such that actions can be taken to mitigate its effect or their effects.

It might be supposed that providing a sequence of received symbols/data to a parametric engine, such as an autoregressive model, would enable the amplitude and frequency of each potential blocker to be determined.

However, the inventor realized that this assumption is unfounded due to significant computational costs of such a process.

As noted above, the computational cost with allowing a large order M within the parametric engine increases rapidly due to the operation of inverting successively large matrices. However, the inventor realized that the performance of an underspecified (low M) parametric engine could be exploited to provide computationally simple system for identifying the poles in a parametric representation of the input data stream.

Figure 17:
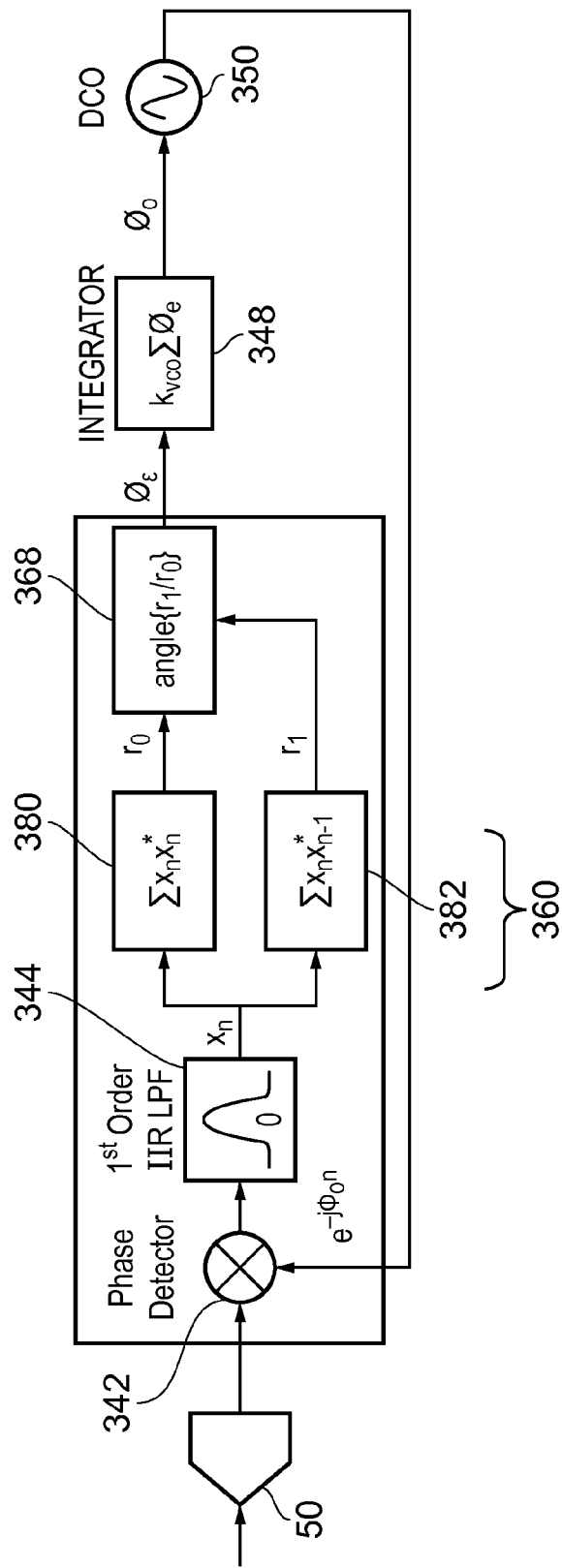
FIG. 17 shows an embodiment of a first order parametric engine.

The inventor observed that if an parametric engine is constrained to have a low order, for example an order of one or two, but is asked to parameterize a system having three or more poles, then the engine tends to place its estimates of the pole position near the positions of the largest pole or poles in the input signal. Thus, although the result is not strictly correct, it is a reasonable approximation to the final result. This can be exploited to narrow down the frequency search space, (i.e. a test range) in a subsequent iteration by bandwidth limiting the input signal so that it excludes the less significant poles but includes the more significant poles. This allows the matrix inversion or other computational cost to be significantly reduced. However it is also desirable that the complexity and cost of the filter is also simplified where possible. This tends to indicate using a filter using a relatively simple band pass characteristic. Taking both these features into consideration the inventor realized that suitable performance could be achieved with a low order parametric engine, and ultimately a single order parametric engine operated in an iterative or recursive manner to search smaller frequency spaces centered around the estimated pole frequency from a preceding iteration. Parametric engines of low order but having an order greater than one can also be implemented relatively easily. An example of a single order parametric engine is shown in FIG. 17 where parts which have been described with respect to FIG. 16 are given like reference numerals. The correlator 360 has a first portion 380 arranged to form a complex autocorrelation $x_n x_n$ and a second portion 382 arranged to form the autocorrelation between the n and the conjugate of a succeeding sample n−1, expressed as $x_n x_{n-1}$ The outputs are designated $r_0$ and $r_1$ of the first portion 380 and the second portion 382, respectively, and are provided to an angle determining unit 368, which can compare the ratio of $r_1$ to $r_0$ to determine an angular displacement on the phasor diagram represented by $\phi_e$, which as described hereinbefore is provided to the integrator 348 that controls the digitally controlled oscillator 350. The circuit in FIG. 17 is a single order (M=1) engine and represents a computationally simple way of providing a parametric engine to identify a blocker.

Figure 18:
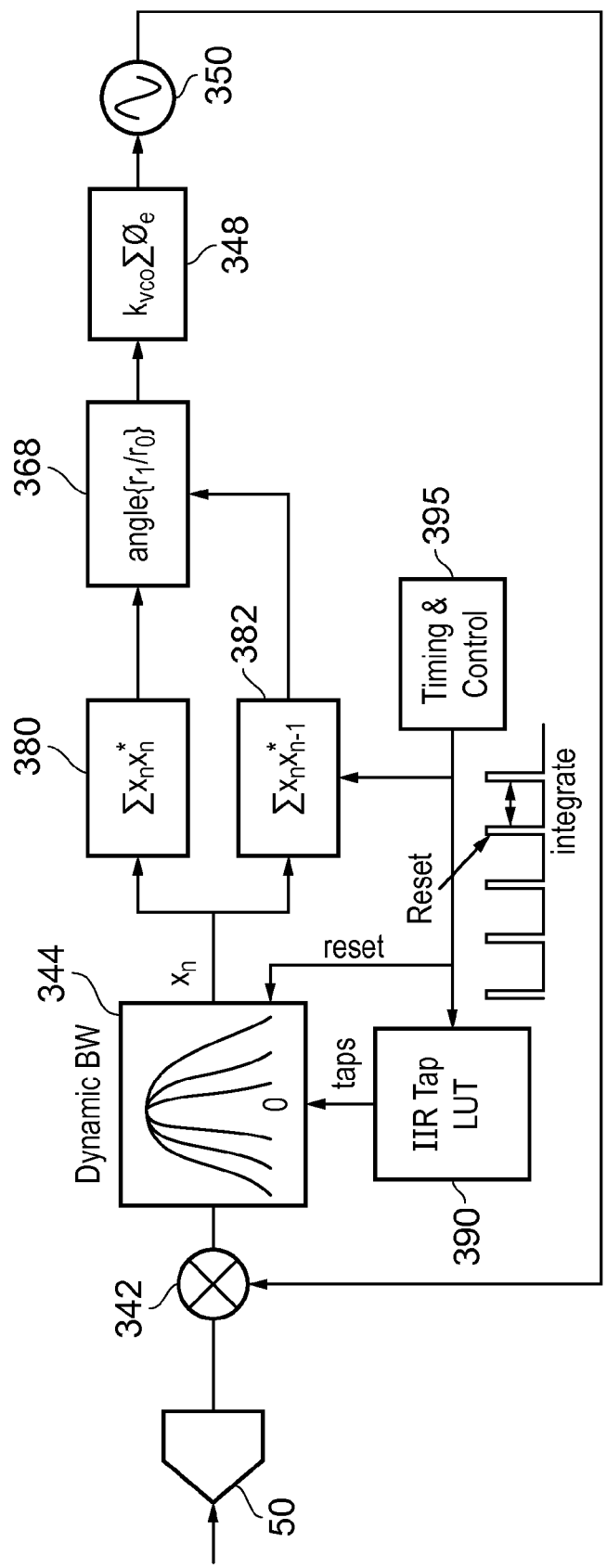
FIG. 18 shows the circuit of FIG. 17 in association with a controller for providing timing and control signals.

The circuit of FIG. 17 is repeated in FIG. 18, together with a graphical representation of the timing and reset signals provided by a timing and control circuit 395 to the correlation blocks 380 and 382, and also to a filter tap lookup table 390 which is used to address and change the tap coefficients between successive iterations of the circuit in order to progressively reduce the pass band of the filter 344 until such time as the position of the potential interfering signal with sufficient accuracy. Thus the circuit shown in FIG. 18 operates to iteratively estimate the frequency of the blocker, and then use the down converter/frequency translator and filter to zoom in on the blocker and to estimate its frequency to a greater accuracy.

As noted before, single order engines are relatively easy to implement but the present disclosure in not limited to the use of first order parametric engines.

The principles and advantages described herein can be implemented in various apparatus. Examples of such apparatus can include, but are not limited to, consumer electronic products, parts of the consumer electronic products, electronic test equipment, wireless communications infrastructure such as a cellular base station, etc. Consumer electronic products can include, but are not limited to, wireless devices, a mobile phone (for example, a smart phone), a telephone, a television, a computer, a hand-held computer, a wearable computer, a tablet computer, a laptop computer, a watch, etc. Further, apparatuses can include unfinished products. The disclosed techniques are not applicable to mental steps, and are not performed within the human mind or by a human writing on a piece of paper.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or "connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings of the inventions provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments have been described, these embodiments have been presented by way of example only, and are not intended to limit the scope of the disclosure. Indeed, the novel methods, systems, and apparatus described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The claims presented here are in single dependency format suitable for filing at the USPTO, but it should be understood that any claim may depend on any one or more preceding claims except where that is clearly infeasible.

What is claimed is:

1. A signal processing apparatus for reducing the impact of an unwanted signal component on a wanted signal component, the apparatus comprising:
   an input configured to receive an input signal which comprises the wanted signal component and the unwanted signal component;
   an output configured to output an output signal;
   a first processor configured to process the input signal by operating on the input signal with a function that includes a term descriptive of the unwanted signal component to create an estimated unwanted signal;

a second processor comprising a filter, the second processor configured to:

iteratively search through progressively smaller frequency ranges to determine a frequency associated with the unwanted signal component, wherein the progressively smaller frequency ranges correspond to a bandwidth of a signal output from the filter in successive iterations; and identify one or more parameters based on the frequency associated with the unwanted signal component; and a correction signal generator configured to generate a correction signal based on the one or more parameters and the estimated unwanted signal, wherein the apparatus is configured to cause an influence of the unwanted signal component on the output signal to be reduced based on the correction signal.

2. An apparatus as claimed in claim 1, in which the unwanted signal component is or comprises a power term $x^n$ of a signal in a signal processing circuit that is connected to the apparatus, and the term descriptive of the unwanted signal component comprises the power term $x^n$.

3. An apparatus as claimed in claim 1, in which the first processor is configured to form the square of the input signal.

4. An apparatus as claimed in claim 1, in which the correction signal generator comprises at least one of a digital filter arranged to receive an input from the first processor or a finite impulse response filter.

5. An apparatus as claimed in claim 1, further including filters configured to select the estimated unwanted signal and at least one of a residual unwanted signal from the output or the unwanted signal component in the input signal, and to provide the selected signals to the second processor.

6. An apparatus as claimed in claim 5, in which the second processor is adapted to form auto-correlation functions of an output of the first processor and cross correlations of the output of the first processor and at least one of the input signal or the output signal as part of the parameter identification.

7. An apparatus as claimed in claim 1, in which the unwanted signal component is a harmonic of a first signal, and wherein the frequency of the first signal is the frequency associated with the unwanted signal component.

8. An apparatus as claimed in claim 7, in which the second processor includes an N point Fast Fourier Transform (FFT) engine, in which N<8 and N is a positive integer.

9. An apparatus as claimed in claim 8, in which the N is less than or equal to 4.

10. An apparatus as claimed in claim 7, in which the second processor comprises a parametric engine.

11. An apparatus as claimed in claim 10, wherein the parametric engine is configured to perform a Levinson recursion.

12. An apparatus as claimed in claim 7, in which the second processor further comprises a frequency converter that together with the filter is configured to select a frequency range for analysis in a successive iteration.

13. An apparatus as claimed in claim 1, in which the second processor is configured to receive the estimated unwanted signal and at least one of the input signal or the output signal.

14. The apparatus of claim 1, wherein the apparatus is configured to substantially cancel a baseband non-linearity.

15. The apparatus of claim 1, wherein the filter has a filter bandwidth that is adjustable and the second processor is configured to decrease the filter bandwidth in the successive iterations.

16. The apparatus of claim 1, further comprising a combiner configured to combine the input signal and the correction signal to form the output signal such that the influence of the unwanted signal component on the output signal is reduced.

17. An apparatus as claimed in claim 16, in which the correction signal generator and the combiner are implemented together.

18. A method of reducing an unwanted signal component within an output signal, the method comprising:

receiving an input signal comprising a wanted signal component and an unwanted signal component;

iteratively searching through progressively smaller frequency ranges of a signal domain to determine a frequency associated with the unwanted signal component, wherein the progressively smaller frequency ranges correspond to a bandwidth of a signal output from a filter s ccessive iterations;

operating on the input signal to form an estimate of the unwanted signal component;

generating a correction signal based on the estimate of the unwanted signal component and the frequency associated with the unwanted signal component;

reducing an influence of the unwanted signal component on the output signal based on the correction signal; and monitoring the output signal to refine the correction signal so as to reduce the influence of the unwanted signal component.

19. A method as claimed in claim 18, in which the unwanted signal component is a second harmonic of a first signal, and the method further comprises identifying the frequency of the first signal no as to estimate a frequency of the unwanted signal component.

20. An apparatus configured to reduce influence of an unwanted signal component, the apparatus comprising:

a blocker detection circuit configured to iteratively search through progressively smaller frequency ranges to determine a frequency associated with the unwanted signal component of an input signal, wherein the blocker detection circuit comprises a filter, and wherein the progressively smaller frequency ranges correspond to a bandwidth of a signal output from the filter in successive iterations;

an adaptation circuit comprising:

at least one tunable filter configured to adjust a pass band based on the frequency associated with the unwanted signal component determined by the blocker detection circuit and to filter a signal indicative of the input signal; and a model circuit configured to generate an estimated correction coefficient based on a signal provided by the at least one tunable filter; and a correction signal generator configured to generate a correction signal based on the estimated correction coefficient, wherein the apparatus is confiured to cause an influence of the unwanted signal component on the output signal to be reduced based on the correction signal.

21. The apparatus of claim 20, further comprising an analog-to-digital converter configured to provide the input signal.

22. The apparatus of claim 20, further comprising a squarer configured to square the input signal to generate a square signal, wherein the correction signal generator is configured to generate the correction signal based on the estimated correction coefficient and the square signal.

23. The apparatus of claim 20, wherein the blocker detector comprises an N point Fast Fourier Transform engine, wherein N is a positive integer less than or equal to 8.

* * * * *

UNITED STATES PATENT AND TRADEMARK OFFICE
CERTIFICATE OF CORRECTION

PATENT NO. : 9,667,291 B2  
APPLICATION NO. : 14/527608  
DATED : May 30, 2017  
INVENTOR(S) : Patrick Joseph Pratt It is certified that error appears in the above-identified patent and that said Letters Patent is hereby corrected as shown below:

In the Specification

In Column 17 at Line 31, Change "$x_n x_n$" to -- $x_n x_n^*$ --.

In Column 17 at Line 34, Change "$x_n x_{n-1}$" to -- $x_n x_{n-1}^*$ --.

In the Claims

In Column 20 at Line 22, in Claim 18, change "s ccessive" to --in successive--.

In Column 20 at Line 36, in Claim 19, change "no" to --so--.

In Column 20 at Line 59, in Claim 20, change "confiured" to --configured--.

Signed and Sealed this  
Seventeenth Day of October, 2017

Joseph Matal  
*Performing the Functions and Duties of the*  
*Under Secretary of Commerce for Intellectual Property and*  
*Director of the United States Patent and Trademark Office*